United States Patent [19]

Morikawa et al.

[11] Patent Number: 5,649,033
[45] Date of Patent: Jul. 15, 1997

[54] IMAGE PROCESSING APPARATUS OUTPUTTING DESIRED IMAGE IRRESPECTIVE OF DIRECTIONS OF ORIGINAL AND OUTPUT PAPER

[75] Inventors: Takeshi Morikawa, Toyokawa; Munehiro Nakatani, Toyohashi, both of Japan

[73] Assignee: Minolta Camera Kabushiki Kaisha, Osaka, Japan

[21] Appl. No.: 123,442

[22] Filed: Sep. 17, 1993

[30] Foreign Application Priority Data

Sep. 18, 1992 [JP] Japan .................................. 4-250207
Sep. 18, 1992 [JP] Japan .................................. 4-250208
Sep. 18, 1992 [JP] Japan .................................. 4-250209
Mar. 3, 1993 [JP] Japan .................................. 5-042434

[51] Int. Cl.$^6$ .................................................. G06K 9/32
[52] U.S. Cl. .................................................. 382/297
[58] Field of Search .................................. 382/44, 45, 46, 382/293, 294, 295, 296, 297, 298; 358/448, 452, 450, 401; 355/319, 320, 202, 311, 313, 308

[56] References Cited

U.S. PATENT DOCUMENTS

| 4,307,958 | 12/1981 | McIrvine ................................ 355/23 |
| 4,591,884 | 5/1986 | Miyamoto et al. ................... 346/153.1 |
| 4,839,740 | 6/1989 | Yoshida .................................. 358/448 |
| 4,851,883 | 7/1989 | Ito .......................................... 355/55 |
| 5,031,116 | 7/1991 | Shukunami et al. ................... 355/311 |
| 5,075,785 | 12/1991 | Sugishima ............................. 358/448 |
| 5,077,811 | 12/1991 | Onda ...................................... 382/46 |
| 5,105,230 | 4/1992 | Emori ..................................... 355/319 |
| 5,239,388 | 8/1993 | Matsumoto ............................ 382/46 |
| 5,508,810 | 4/1996 | Sato ........................................ 382/297 |

FOREIGN PATENT DOCUMENTS

| 61-66657 | 4/1986 | Japan . |
| 63-242664 | 10/1988 | Japan ............................. G06F 3/12 |
| 2-50862 | 2/1990 | Japan . |
| 2-257763 | 10/1990 | Japan . |
| 3-79541 | 4/1991 | Japan . |

*Primary Examiner*—Leo Boudreau
*Assistant Examiner*—Phuoc Tran
*Attorney, Agent, or Firm*—Sidley & Austin

[57] ABSTRACT

In an image signal processing portion, the size of an original papersheet is detected, and image data is provided with respect to a memory unit. The size of a copy papersheet is detected using a detecting sensor, not shown. Data of an original image is read out by a CCD to be stored in an image memory. When printing is carried out based on the image data, the feeding directions and the sizes of the original papersheet and the copy papersheet are taken into consideration. When the feeding directions of the original and the copy papersheet are the same, only a variable-scale magnification processing portion is activated to carry out only a variable-scale magnification processing. When the feeding directions of the original papersheet and the copy papersheet are different, a rotation and a variable-scale magnification of an image signal are carried out by a rotation processing portion and the variable-scale magnification processing portion. As a result, irrespective of the direction and the size of the original, the image is automatically copied onto the copy papersheet.

6 Claims, 41 Drawing Sheets

FIG.24

| ADDRESS | FST · WHT | LST · WHT |
|---|---|---|
| 0 | 0 | 0 |
| l | 0 | 0 |
|  | ⋮ | ⋮ |
| k-l | 0 | 0 |
| k | OTHER THAN FIRST 0 | OTHER THAN FIRST 0 |
|  | ⋮ | ⋮ |
| l | MINIMUM VALUE OF FST · WHT | * |
|  | ⋮ | ⋮ |
| m | * | MAXIMUM VALUE OF LST · WHT |
|  | ⋮ | ⋮ |
| n | OTHER THAN LAST 0 | OTHER THAN LAST 0 |
|  | 0 | 0 |
|  | 0 | 0 |
|  | ⋮ | ⋮ |

| PAGE | ORIGINAL LONGITUDINAL LENGTH | ORIGINAL LATERAL LENGTH |
|---|---|---|
| 1 | 297 | 210 |
| 2 | 210 | 297 |
| 3 | 364 | 257 |
| ⋮ | | |

FIG.28

STEP 1 - DETECT PAPER SIZE (LONGITUDINAL LENGTH/LATERAL LENGTH) CARRY OUT PRELIMINARY SCANNING AND DETECTION IN IR PORTION

STEP 2 - TRANSFER AND WRITE READ OUT IMAGE DATA TO MEMORY PORTION FROM IR PORTION

STEP 3 - CARRY OUT THE FOLLOWING STEPS IN MEMORY PORTION.COUNT NUMBER OF BLACK PIXELS FOR EVERY MAIN/SUBSCANNING

STEP 4 - DISCRIMINATE LANDSCAPE/PORTRAIT BASED ON DISTRIBUTION OF NUMBER OF BLACK PIXELS FOR EVERY LINE

STEP 5 - READ OUT LINE ALONG DIRECTION OF LINE DISCRIMINATED AT STEP 4.AS A RESULT,HEIGHT OF CHARACTER IS FOUND (READ OUT ONLY LEADING LINE)

STEP 6 - COUNT NUMBER OF BLACK PIXELS IN CHARACTER DIRECTION FOR LINE READ OUT AT STEP 5

STEP 7 - READ OUT CHARACTER BASED ON DISTRIBUTION OF NUMBER OF BLACK PIXELS

STEP 8 - DETERMINE PATTERN MATCHING WITH REFERENCE CHARACTER PATTERN FOR EVERY CHARACTER

STEP 9 - CALCULATE AND STORE NUMBER OF CHARACTERS WHICH CAN BE DISCRIMINATED FOR ONE LINE

STEP 10 - CARRY OUT STEOS 8, 9 BY ROTATING REFERENCE CHARACTER PATTERN BY 90°, 180°, 270°

STEP 11 - COMPARE NUMBER OF CHARACTERS WHICH CAN BE DISCRIMINATED FOR EVERY ROTATION ANGLE OF REFERENCE CHARACTER PATTERN FOUND AT STEPS 9, 10 AND DETERMINE THAT ANGLE (AT WHICH NUMBER IS LARGEST) IS DIRECTION OF CHARACTER

STEP 12 - DETERMINE DIRECTION OF ORIGINAL BASED ON INFORMATION OF STEPS 1, 4, 11

FIG.33

CHARACTER RECOGNITION RATIO FOR RESPECTIVE PHONT ROTATION ANGLE

| STEP10,11,12) CHARACTER READ OUT | | | | | | | A 0° | A 90° | ∀ 180° | ∀ 270° | ROTATION ANGLE | DISCRIMINATION RESULT FROM STEP 4 | FINAL RECOGNITION RESULT |
|---|---|---|---|---|---|---|---|---|---|---|---|---|---|
| P1 | A | B | C | D | E | F | 5/6 | 1/6 | 1/6 | 1/6 | 0° | PORTRAIT | PORTRAIT NORMAL IMAGE |
| P2 | ᴚ | Ό | ᴘ | O | N | M | 1/6 | 1/6 | 5/6 | 1/6 | 180° | PORTRAIT | PORTRAIT REVERSED (180°) IMAGE |
| L1 | A | B | C | D | E | F | 1/6 | 5/6 | 1/6 | 1/6 | 90° | LANDSCAPE | LANDSCAPE NORMAL IMAGE |
| L2 | ᴚ | Ό | ᴘ | O | N | M | 1/6 | 1/6 | 1/6 | 5/6 | 270° | LANDSCAPE | LANDSCAPE REVERSED (180°) IMAGE |

(ERRONEOUS RECOGNITION RATIO=20%)

FIG.34

| PAGE | ORIGINAL LONGITUDINAL LENGTH | ORIGINAL LATERAL LENGTH | CHARACTER DIRECTION | ANGLE |
|---|---|---|---|---|
| 1 | 297 | 210 | PORTRAIT | 0° |
| 2 | 297 | 210 | PORTRAIT | 180° |
| 3 | 210 | 297 | LANDSCAPE | 90° |
| 4 | 210 | 297 | LANDSCAPE | 270° |
| | | | | |

DT2

IMAGE PROCESSING APPARATUS OUTPUTTING DESIRED IMAGE IRRESPECTIVE OF DIRECTIONS OF ORIGINAL AND OUTPUT PAPER

BACKGROUND OF THE INVENTION

1. Field of the Invention

The present invention generally relates to image processing apparatuses, and more particularly, to an image processing apparatus including an ADF (Automatic Document Feeder) and/or an AMS (Automatic Magnification Selection) function automatically calculating a copying magnification to output an image.

2. Description of the Related Art

An ADF has been conventionally provided in an image processing apparatus such as a digital copying apparatus. An original is automatically fed to a reading position of the copying apparatus using the ADF.

When originals are fed to a copying portion using the ADF, there is a case where some originals are set with the direction of top and bottom of an image reversed with respect to that of other originals. In this case, the copied results are also outputted upside down. As a result, the operator must reverse the outputted copy papersheets in order to make all the images headed in one direction.

In copying originals having images on both sides set with their longer sides along the feeding direction onto each side of copy papersheets, the originals are reversed by the ADF. Thus images on back sides of the originals are all upside down, and the copied results are discharged to a discharge tray with top and bottom reversed for every other papersheet.

There is a copying apparatus including an AMS function of, when the mounting direction of an original and the feeding direction of a copy papersheet are the same, automatically calculating a copying magnification and outputting the image onto a copy papersheet.

However, in a copying apparatus having the conventional AMS function, the AMS function does not work when the mounting direction of an original and the feeding direction of a copy papersheet are different.

SUMMARY OF THE INVENTION

One object of the present invention is to form a desired image irrespective of the feeding directions of an original and a copy papersheet in an image processing apparatus having an ADF or art AMS function.

Another object of the present invention is to make the same all top and bottom directions of outputted images even when an original having images on both sides is copied onto one side of each output portion such as a copy papersheet in an image processing apparatus having an ADF.

Still another object of the present invention is to output images with the images automatically headed in one direction without requiring the operator to take care of the top and bottom directions of originals in an image processing apparatus having an ADF.

A further object of the present invention is to carry out desired copying irrespective of the feeding directions of an original and a copy papersheet in a copying apparatus having an AMS function.

The above-described objects of the present invention are accomplished by, when an original having images on both sides is reversed and read out, rotating the read out image data by 180° for any one of the images on both sides in an image processing apparatus having an ADF. Since the reversed and read out original is selectively rotated by 180° and outputted, it is possible to set outputted images in a predetermined direction. As a result, it is possible to provide an image processing apparatus in which all outputted images are headed in one direction even when originals having images on both sides set with their longer sides along the feeding direction are copied onto each side of output portions such as copy papersheets.

In another aspect of the present invention, an image processing apparatus detects the top and bottom directions of original images to be read. In response to the detected result, the read out images are rotated, so that outputted images are headed in a predetermined direction. Therefore, even if the directions of the original images are different, the outputted images can be headed in one direction. As a result, it is possible to provide an image processing apparatus in which outputted images automatically headed in one direction can be obtained without requiring an operator to take care of the top and bottom directions of the originals.

In still another aspect of the present invention, the sizes and the directions of an original and a copy papersheet are detected. In response to the detected result, longer sides or shorter sides are compared to determine enlarging and reduction ratios irrespective of the directions of the original and the papersheet. As a result, it is possible to provide a copying apparatus in which an AMS function can work irrespective of the feeding directions of the original and the copy papersheet.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 24 is a diagram showing contents of a buffer.

FIG. 25 is a diagram showing an original management table DT1.

FIG. 28 is a diagram showing a discrimination algorithm of the mounting direction of an original.

FIG. 33 is a diagram showing a specific example discriminating the direction of an original based on the result of character recognition.

FIG. 34 is a diagram showing the contents of an original management table.

DESCRIPTION OF THE PREFERRED EMBODIMENTS

Description will be given of embodiments of the present invention with reference to the drawings hereinafter.

(1) First Embodiment

Figure 1:
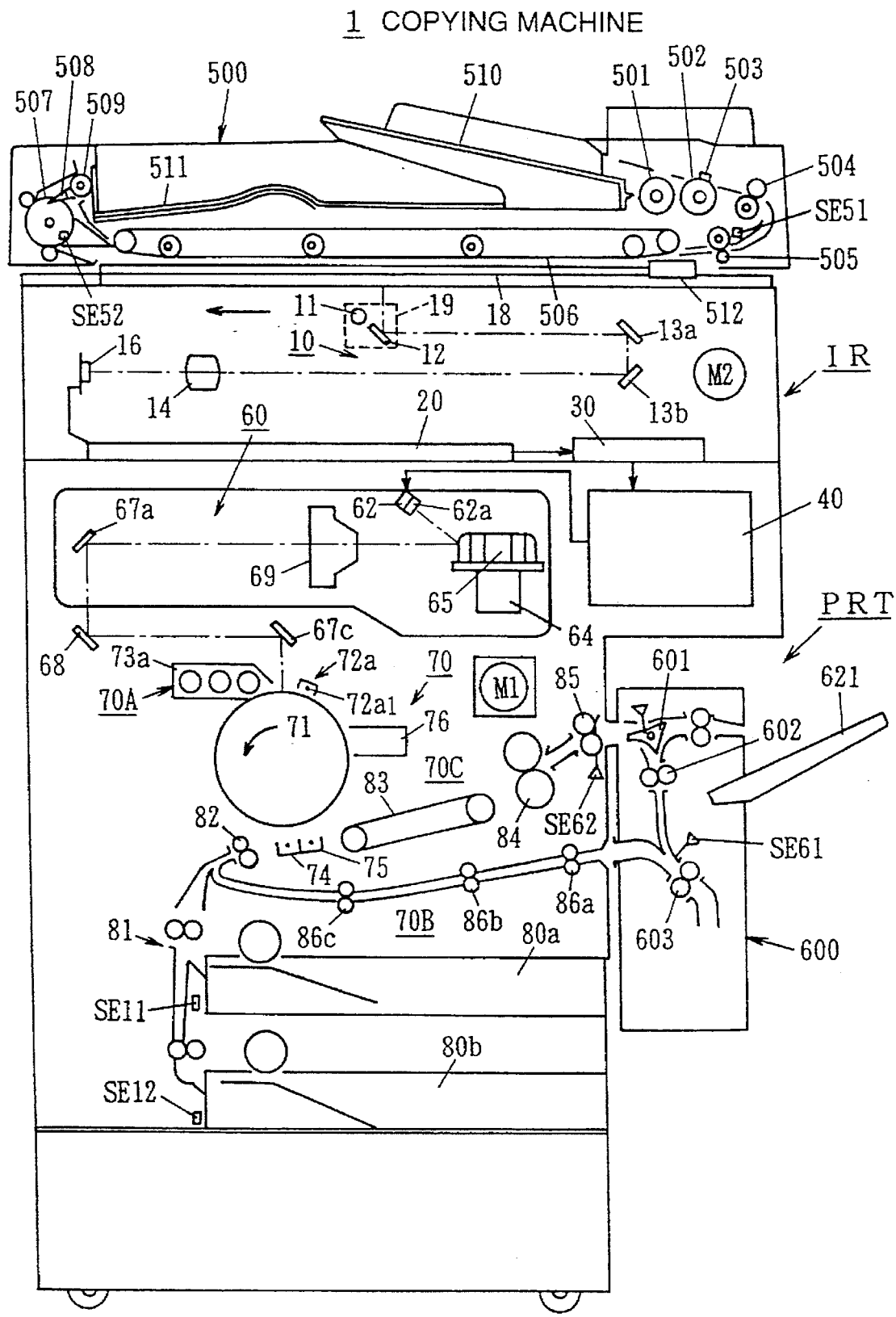
FIG. 1 is a cross sectional view showing the entire configuration of a copying apparatus according a first embodiment of the present invention.
Figure 2:
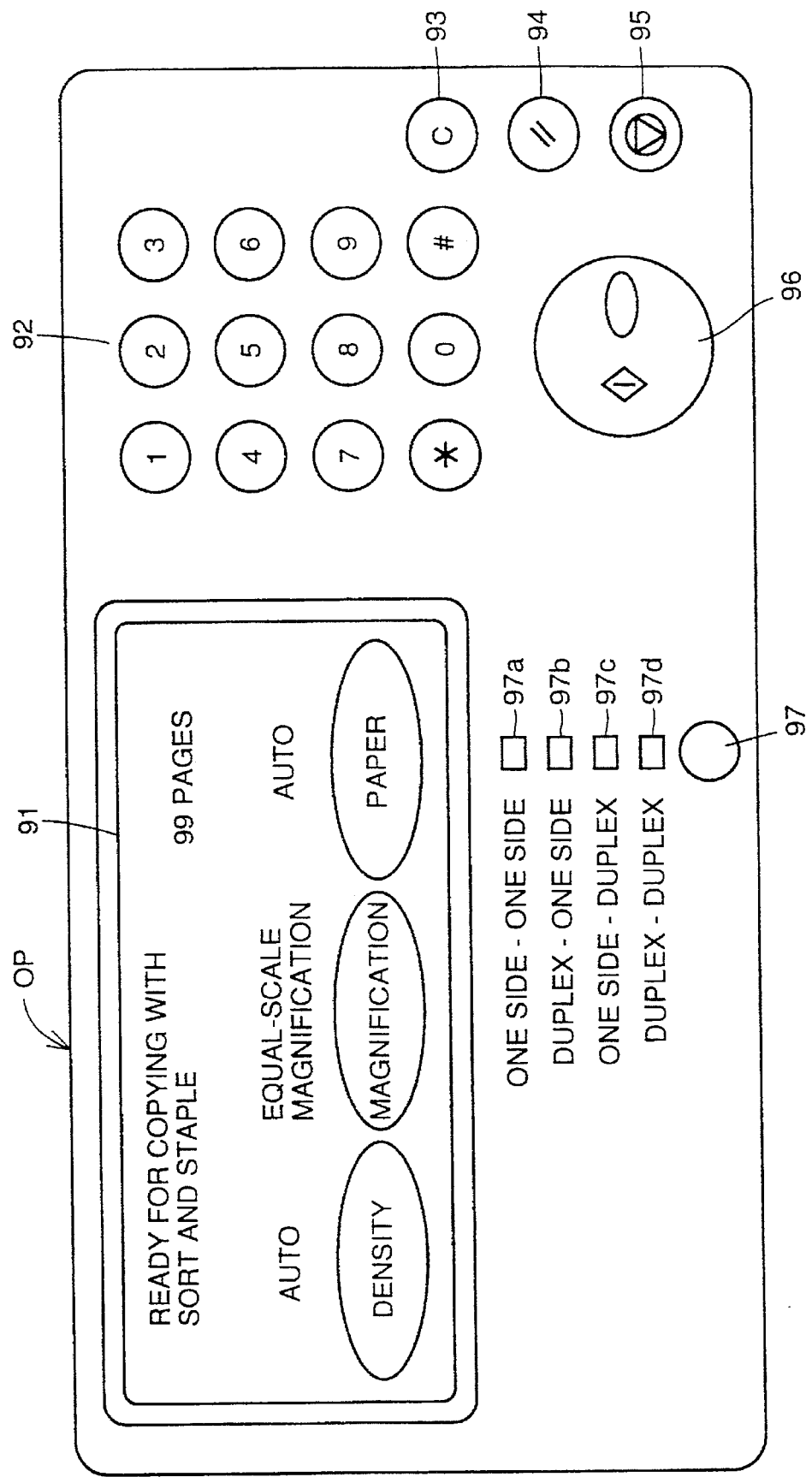
FIG. 2 is a front view of an operation panel.

Referring to FIGS. 1 and 2, a copying apparatus 1 includes a scanning system 10 reading out an original to convert the same into an image signal, an image signal processing portion 20 processing an image signal transmitted from scanning system 10, a memory unit portion 30 carrying out switching or the like between outputting image data applied from image processing portion 20 directly to a printer and storing the image data in a memory or the like, a printing processing portion 40 driving a semiconductor laser 62 based on image data inputted from memory unit portion 30, an optical system 60 leading laser light from semiconductor laser 62 to an exposure position on a photoreceptor drum 71, an image forming system 70 developing a latent image formed by exposure light, transferring the same onto a papersheet, and fixing the same to form an same, an operation panel OP provided on the upper surface of a body, an original feeding portion 500 feeding an original and carrying out reversal of front and back sides as needed, and a paper refeeding portion 600 refeeding a papersheet to a transfer position.

Image reader IR is structured of scanning system 10, image signal processing portion 20 and the like. A printer PRT is structured of printing processing portion 40, optical system 60, image forming system 70, and the like.

Scanning system 10 includes an exposure lamp 11 and a first mirror 12 incorporated into a scanner 19 traveling under a platen glass 18, fixed mirrors 13a, 13b, a condenser lens 14, a photoelectric converting element 16 using a CCD array or the like, and a scan motor M2.

Photoelectric converting element 16 receives light reflected by the original and projected by lens 14 to convert the same into an electric signal depending on an amount of received light (image density).

Image signal processing portion 20 processes an image signal provided from photoelectric converting element 16, detects the paper size of the original and the like, and provides image data to memory unit portion 30. Detailed description will be given later of memory unit portion 30.

Printing processing portion 40 applies transmitted image data to semiconductor laser 62 depending on the same. Optical system 60 includes semiconductor laser 62, a polygonal mirror 65 deflecting a composite laser beam, a main lens 69, a reflecting mirror 67a, and a reflecting mirror 67c.

Image forming system 70 includes a developing and transfer system 70A, a feeding system 70B, and a fixing system 70C.

Developing and transfer system 70A includes a photoreceptor drum 71 rotated and driven in the counterclockwise direction of FIG. 1, and a corona charger 72a, a developing device 73a, a transfer charger 74, a copy paper separation charger 75, a cleaning portion 76 disposed in order from the upstream in the rotation direction in the periphery thereof. A two-component developer of toner and carrier is housed in developing device 73a.

Feeding system 70B includes cassettes 80a, 80b housing papersheets, size detecting sensors SE11, 12 detecting the paper size, a paper guide 81, a timing roller 82, a transport belt 83, and a horizontal feeding rollers 86a to c feeding papersheets carried in from paper refeeding portion 600.

Fixing system 70C includes a fixing roller 84 heat-fixing and feeding a papersheet, a discharge roller 85, and a discharge sensor SE62 detecting discharge of a papersheet.

Paper refeeding portion 600 is of a circulating type in which a papersheet discharged from discharge roller 85 is once housed and carried in to horizontal feeding roller 86a of feeding system 70B for forming again an image (printing) with front and back sides reversed in a duplex copy mode and not reversed in a composite copy mode. Paper refeeding portion 600 includes a switching claw 601 switching between discharge of paper to a discharge tray 621 and refeeding of paper, a feeding roller 602, a reversing roller 603, and a reversing sensor SE61.

In the duplex copy mode, a left end of switching claw 601 is travelled upward by a solenoid, not shown. As a result, the papersheet discharged from discharge roller 85 is led toward feeding roller 602 to reach reversing roller 603 through feeding roller 602.

When the rear end of a papersheet reaches reversing sensor SE61, reversing roller 603 is reversed. As a result, the papersheet is fed to horizontal feeding roller 86$a$. The papersheet reaches timing roller 82 through horizontal feeding rollers 86$b$, $c$ to stand by. At this time, the next papersheets are sequentially fed at a predetermined interval. The number of papersheets with one side copied which can be kept standing by depends on the length of the papersheet, provided that there is no delay of the image data.

Original feeding portion 500 automatically feeds originals set on an original paper feed tray 510 onto platen glass 18. Original feeding portion 500 reads out the originals by scanner 19 before discharging the same to an original discharge portion 511.

Original feeding portion 500 includes a feeding roller 501, a sorting roller 502, a sorting pad 503, an intermediate roller 504, a register roller 505, a transport belt 506, a reversing roller 507, a switching claw 508, a discharge roller 509, a feeding tray 510, a discharge tray 511, an original scale 512, a paper feeding sensor SE51, and a discharge sensor SE52.

An operation of original feeding portion 500 depends on the reading mode of the original. The reading mode of the original includes a scan mode reading out the original by a scanning operation of scanner 19, and an original traveling mode reading out the original while it is being fed with scanner 19 halted.

Therefore, as for operations of original feeding portion 500, there are a scan one side mode (sometimes simply referred to "one side mode"), an original traveling one side mode, an original traveling duplex mode, and the like, depending on whether only one side of the original or both sides of the original is read out.

In the one side mode, one or a plurality of originals are set on feeding tray 510 with a side or sides to be read out facing up. When the operation is started, the set originals are sequentially fed by feeding roller 501 from the lowermost original, and precisely positioned on platen glass 18. At this time, the front end of the next original reaches register roller 505, so that a time required for feeding of the next original can be shortened.

Scanner 19 scans the original to read out the front side (the surface facing down) thereof. When reading out of the original is completed, the original is fed leftward by transport belt 506, U-turns at reversing roller 507, and passes over switching claw 508 to be discharged onto discharge tray 511 by discharge roller 509. At this time, the original is discharged with the side read out (front side) facing up.

Then, description will be given of the original traveling one side mode. The original traveling one side mode can be employed, for example, when single copying is carried out, in which an operation synchronized with scanning system 10 is carried out.

More specifically, the operation is the same as in the case of the above one side mode until the original passes through register roller 505. After that, the original is fed by transport belt 506 at a predetermined speed corresponding to a copying magnification to be directly discharged onto discharge tray 511 through reversing roller 507. In the meantime, scanner 19 halts at the right end of platen glass 18. Since the original passes over scanner 19, the front side of the original while it is being fed is read out.

Therefore, unlike the one side mode, operations such as reversal positioning of the original, scanning and returning of scanner 19 are not carried out, resulting in reading out of the original at a high speed.

Description will now be given of the original traveling duplex mode. In the original traveling duplex mode, operations are the same as in the case of the above-described original traveling one side mode until the front side of the original is read out. However, in the meantime, switching claw 508 is switched so that the left end thereof faces upward. After U-turning at reversing roller 507, the original whose front side has been read out passes under switching claw 508 to be again led under transport belt 506 with front and back sides reversed.

In the meantime, scanner 19 travels to the left when reading of the front side of the original is completed, and stands by at a back side reading position depending on the length of the original. The back side reading position is slightly rightward of a position where the front end and the rear end of the original match when the original U-turns at reversing roller 507, that is, a position where the travelling length of the front end of the original coincides with the length of the original.

Therefore, the back side reading position varies depending on the length of the original. When the front end and the back end do not match on the upper surface of platen glass 18 because of a short original, the left end of platen glass 18 is the back side reading position. It should be noted that the length of the original is detected by paper feeding sensor SE51 during the original being fed.

The original again led under transport belt 506 is fed rightward by reversed transport belt 506 at a predetermined speed depending on a copying magnification. Since the original passes over scanner 19 standing by at the back side reading position while it is being fed, the back side of the original being fed is read out.

When reading of the back side of the original is completed, transport belt 506 is reversed to feed the original leftward. After the left end of the original reversed by reversing roller 507 to be again led under transport belt 506 and fed rightward reaches transport belt 506, the original is again fed leftward and passed over reversing roller 507 and switched switching claw 508 to be discharged onto discharge tray 511 by discharge roller 509. As a result, the original is discharged with the front side facing up.

Referring to FIG. 2, operation panel OP includes a liquid crystal touch panel 91, a ten key 92 inputting a number and a magnification, a clear key 93 for returning the inputted number to a standard value "1", a panel reset key 94 for returning a set value or the like in copying apparatus 1 to a standard value, a stop key 95 for stopping a copying operation, a start key 96 for starting a copying operation, a mode set key 97 for setting a copy mode, and display portions 97$a$ to 97$d$ displaying the copy mode.

Liquid crystal touch panel 91 displays various states of copying apparatus 1 such as occurrence of a JAM, a serviceman call, a paper empty, operation modes of copying apparatus 1 such as an exposure level, a magnification, a copy paper size, and other various kinds of information, as well as carries out input for selection of an operation mode.

Figure 3:
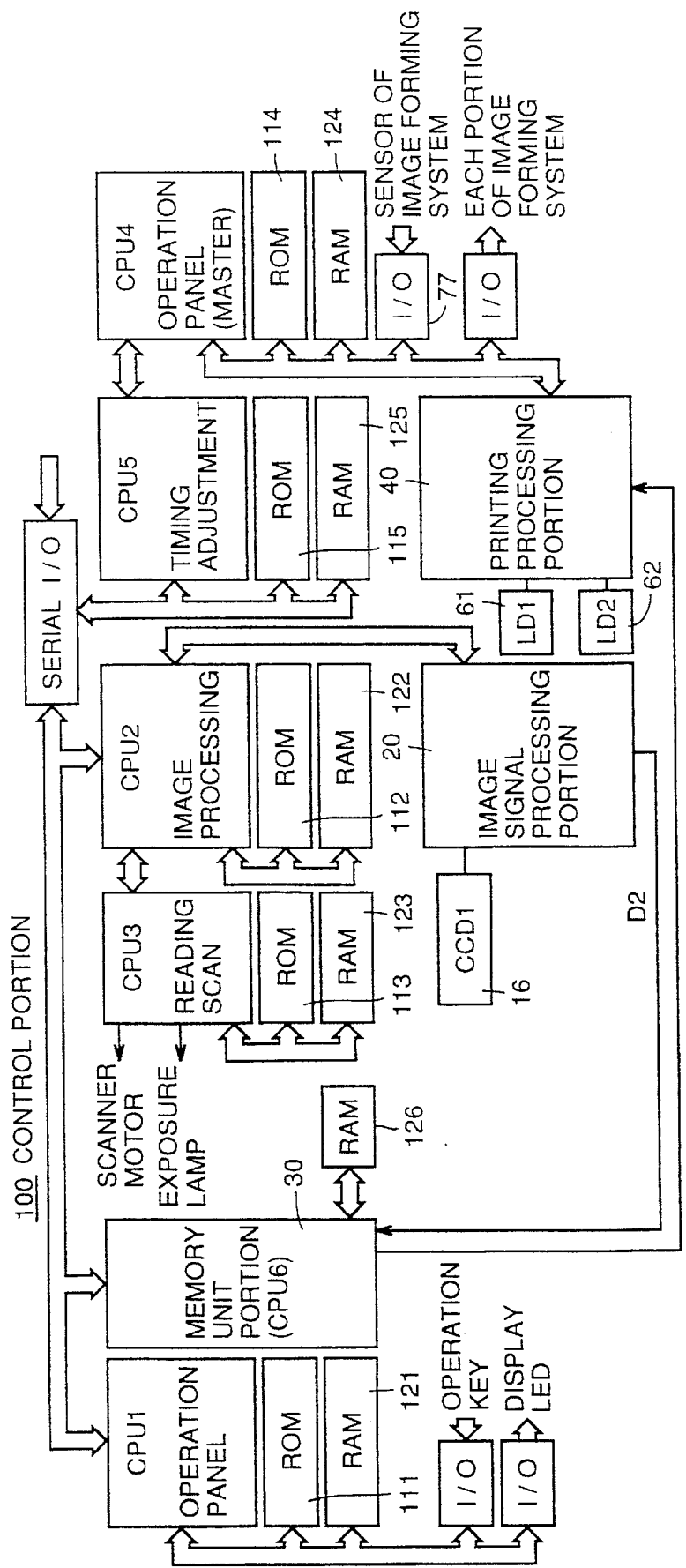
FIGS. 3 and 4 are block diagrams showing a configuration of a control portion of the copying apparatus.
Figure 4:
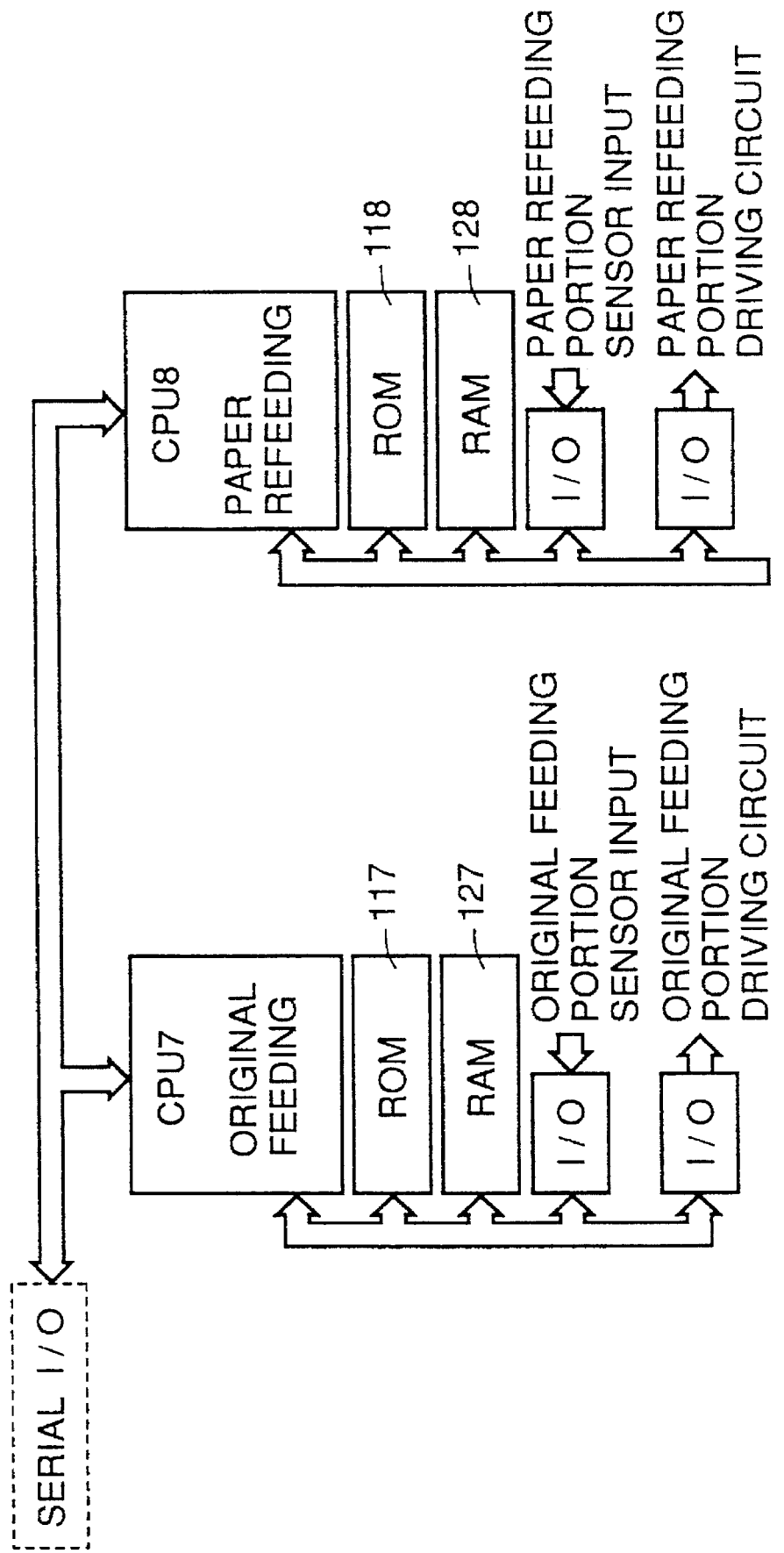

Description will now be given of a control portion 100. FIGS. 3 and 4 are block diagrams showing the configuration of control portion 100 of copying apparatus 1.

Control portion 100 is mainly structured of eight CPUs 1 to 8. CPUs 1 to 8 include ROMs 111 to 118 having a program stored therein, and RAMs 121 to 128 serving as a work area for program execution. CPU 6 is provided in memory unit portion 30 (cf. FIG. 5).

CPU 1 carries out control relating to input and display of signals from various operation keys of operation panel OP. CPU 2 controls each portion of image signal processing portion 20. CPU 3 drives and controls scanning system 10. CPU 4 controls printing processing portion 40, optical system 60, and image forming system 70. CPU 5 carries out processing for the overall timing adjustment and setting of an operation mode of control portion 100.

CPU 6 once stores image data read out by controlling memory unit portion 30 in a memory (an image memory 304) to read out the same for output to printing processing portion 40. As a result, image reader IR and printer PRT are independently controlled so that a copying speed is improved. Detailed description will follow.

CPU 7 controls original feeding portion 500, and CPU 8 controls paper refeeding portion 600. Among these CPUs 1 to 8, serial communication by interrupt is carried out for reception and transmission of commands, reports and other data.

A signal from paper size detecting sensors SE11, 12 is applied to an image forming system sensor I/O 77, and the size of a copy papersheet is managed in CPU 4.

Description will now be given of each processing portion processing image data. Image signal processing portion 20 includes an A/D converter, a shading correction portion, a color discriminating portion discriminating colors of pixels of the original based on the image data, a variable-scale magnification processing portion, and an image quality correcting portion.

An image signal applied from photoelectric converting element 16 is quantized into image data of 8 bits for every pixel by image signal processing portion 20 to be provided as image data D2 after being subjected to various processing.

Figure 5:
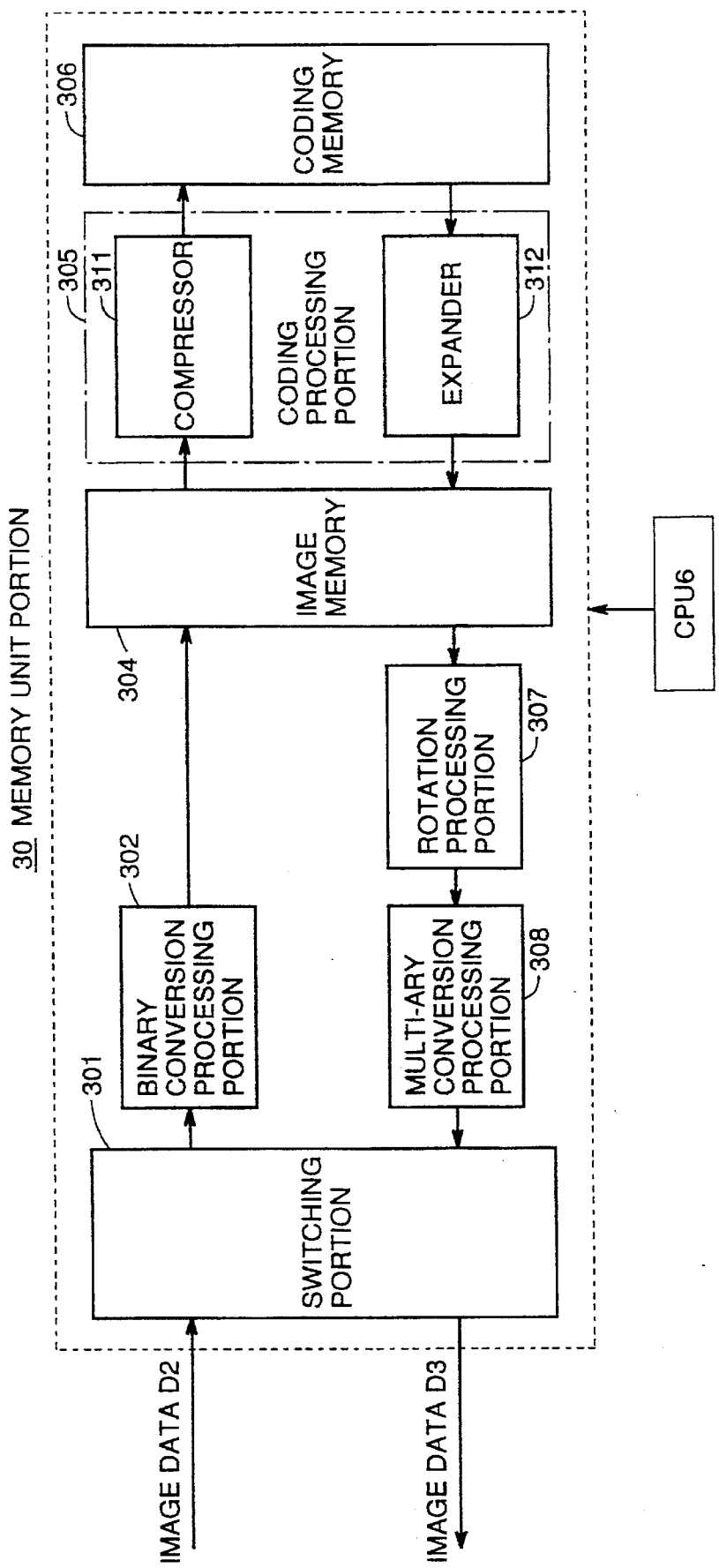
FIG. 5 is a block diagram of a memory unit portion of the first embodiment.
Figure 6:
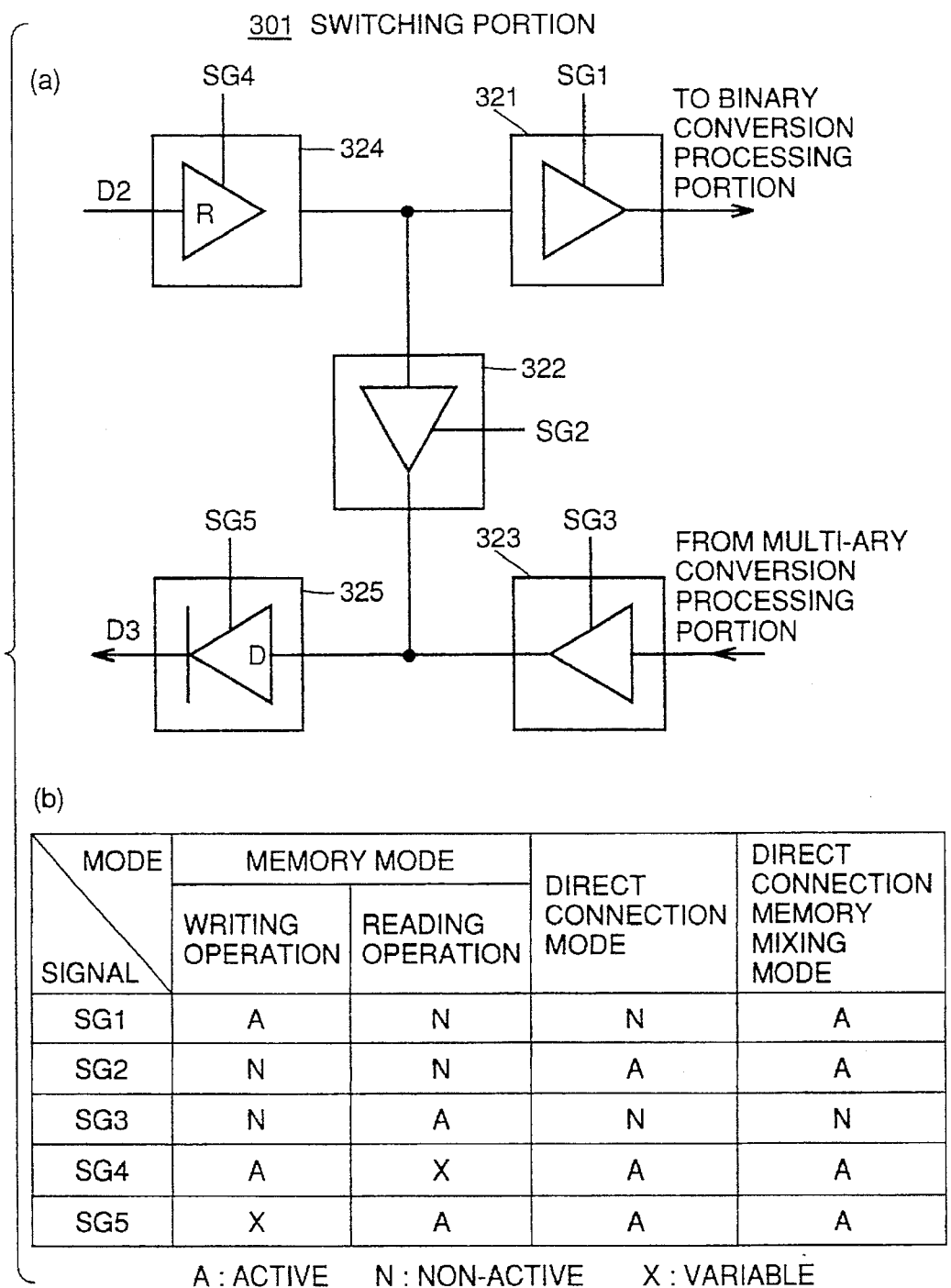
FIG. 6 is a block diagram of a switching portion in the memory unit portion.

Description will now be given of memory unit portion 30. FIG. 5 is a block diagram of memory unit portion 30, and FIG. 6 is a block diagram of a switching portion 301 of memory unit portion 30.

Memory unit portion 30 includes switching portion 301, a binary conversion processing portion 302 creating binary data based on parameter setting from CPU 6, multiport image memory 304 having a capacity of one page of an A4 sized papersheet in 400 dpi, a coding processing portion 305 having independently operable compressor 311 and expander 312, a coding memory 306 having a multiport, a rotation processing portion 307, a multi-ary conversion processing portion 308 creating multi-ary data based on the parameter setting from CPU 6, and CPU 6 controlling all of them.

The binary conversion processing carried out in binary conversion processing portion 302 includes not a simple binary conversion but a pseudo half tone binary conversion such as dither processing.

In FIG. 6(a), switching portion 301 includes five bus gates 321 to 325 on (connection)/off (disconnection) controlled by respective control signals SG1 to SG5. As is shown in FIG. 6(b), each of control signals SG1 to SG5 is rendered active (A) or non-active (N) in response to an operation mode. Combination of these signals sets a connection state of switching portion 301, and controls a flow of image data.

When image data D2 is written into image memory 304, coding processing portion 305 reads out and compresses the data to create coding data, and writes the same into coding memory 306. In response to an instruction of CPU 6, coding processing portion 305 reads out the coding data written into coding memory 306, expands the same to create image data, and writes the same into image memory 304.

When image data for one page is created in image memory 304 by expansion, the image data is read out to be subjected to the rotation processing in rotation processing portion 307 as needed. Multi-ary image data is created in multi-ary conversion processing portion 308 to be provided as image data D3. Compressor 311 and expander 312 can be operated independently from and in parallel with each other. Data is DMA transferred between compressor 311 and expander 312, and coding memory 306.

Coding memory 306 is managed by a management table MT1 stored in RAM 121.

Management table MT1 stores the number showing a region of coding memory 306, the page number, the number of coupled regions, and various kinds of additional information necessary for the compressing/expanding processing such as a compressing system, a data length or the like. Based on these kinds of information, coding memory 306 is dynamically managed.

When CPU 6 reads out the image data from image memory 304 and compresses the same, CPU 6 creates information of management table MT1, and controls compressor 311 to store the information in coding memory 306. In outputting the image data, CPU 6 reads out the coding data from coding memory 306 by carrying out the opposite operation. As for information in management table MT1, information of a page of interest is erased when the necessary number of papersheets are all normally discharged.

The operation mode of memory unit portion 30 includes a direct connection mode, a memory mode, and a direct connection memory mixing mode. The memory mode includes two operations of a memory mode writing operation and a memory mode reading operation. The direct connection memory mixing mode is a mode in which the direct connection mode and the memory mode are mixed.

In the direct connection mode, image data D2 provided from image signal processing portion 20 is directly provided to printing processing portion 40 as image data D3. More specifically, in the direct connection mode, bus gates 322, 324 and 325 of switching portion 301 are turned on. As a result, a bus of image signal processing portion 20 and a bus of printing processing portion 40 are directly connected, and image data D2 is directly provided as image data D3.

In the memory mode, after being binary-converted, image data D2 is taken in by image memory 304 to be subjected to a predetermined processing. Image data D2 is read out from image memory 304 as needed to be provided to printing processing portion 40 as image data D3.

More specifically, in the memory mode, in the memory mode writing operation (from the image reader to the memory), bus gates 321 and 324 are turned on, and image data D2 is provided to binary conversion processing portion 302. After being binary-converted, image data D2 is written into image memory 304, and further compressed to be written into coding memory 306.

In the memory mode reading operation (from the memory to the printer), bus gates 323 and 325 are turned on. The image data expanded from image memory 304 is read out to be provided as image data D3.

In the direct connection memory mixing mode, bus gates 321, 322, 324 and 325 are turned on. Image data D2 is directly provided to printing processing portion 40 as image data D3. Simultaneously, image data D2 is written into image memory 304 via binary conversion processing portion 302.

Such an operation mode of memory unit portion 30 is automatically selected in response to a copy mode. For example, in an ordinary one side original→one side copy mode or duplex original→duplex copy mode, the direct connection mode is selected. In a one side original→duplex copy mode or duplex original→one side copy mode, the memory mode is selected.

Figure 7:
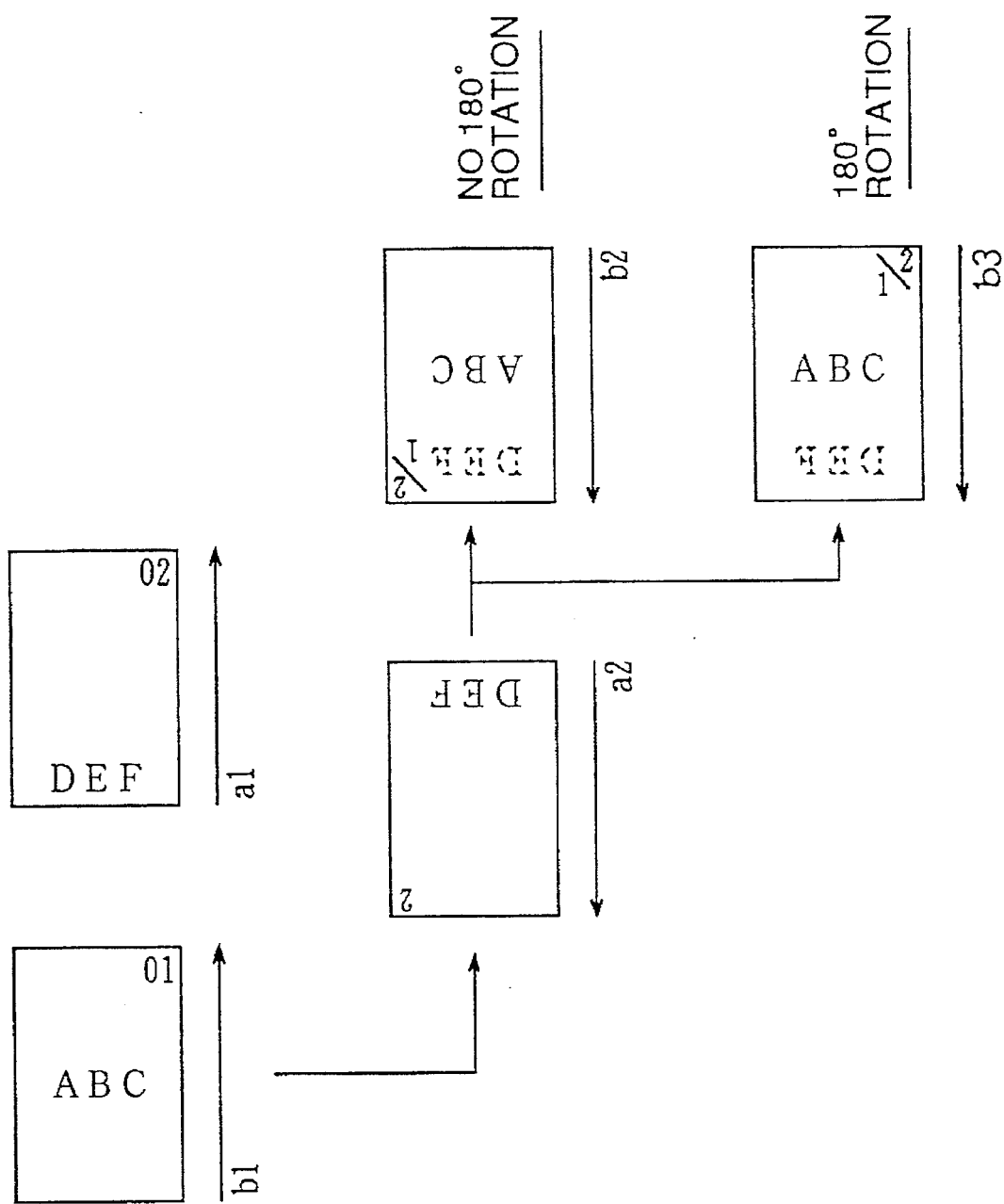
FIGS. 7 and 8 are diagrams showing a specific example of an operation of the first embodiment.

A specific example will be shown in the one side original→duplex copy mode. Consider the case where an original O1 having "ABC" written only on side and an original O2 having "DFF" written only on one side are duplex copied as shown in FIG. 7. When the originals are copied using copying apparatus 1 shown in FIG. 1, originals O1, O2 are set on original feeding tray 500 in this order from the top with the sides to be copied facing up. Original O2 is first fed onto platen glass 18, and image information of original O2 is copied onto one side of a papersheet fed from paper cassette 80a or 80b. As shown in FIG. 7, since the image is read out in the direction of an arrow from since a point a1 in FIG. 7, printing is-carried out on the papersheet in the direction of an arrow from a point a2.

Then, image information of original O1 is printed onto another side of the papersheet. Similar to the above, original O1 is fed onto platen glass 18, and the image is read out in the direction of an arrow from a point b1 of FIG. 7. After printing of the image of original O2 is completed, the papersheet reverses its front and back sides at paper refeeding portion 600 to be refed through a horizontal refeeding path. At this time, if the image is printed in the direction of an arrow from the point b2 without carrying out the rotation processing by 180°, the duplex copied papersheet is discharged with images on front and back sides reversed.

In order to solve the problem, printing is carried out in the direction of an arrow from a point b3 after being subjected to the rotation processing by 180°. As a result, the duplex copied papersheet is discharged with images on front and back sides not reversed as shown in the figure.

In the above-described example, the rotation processing by 180° was carried out with respect to original O1. However, the similar effect can be obtained by carrying out the 180° rotation processing with respect to original O2 in advance.

A specific example will now be shown in the duplex original→one side copy mode.

Figure 8:
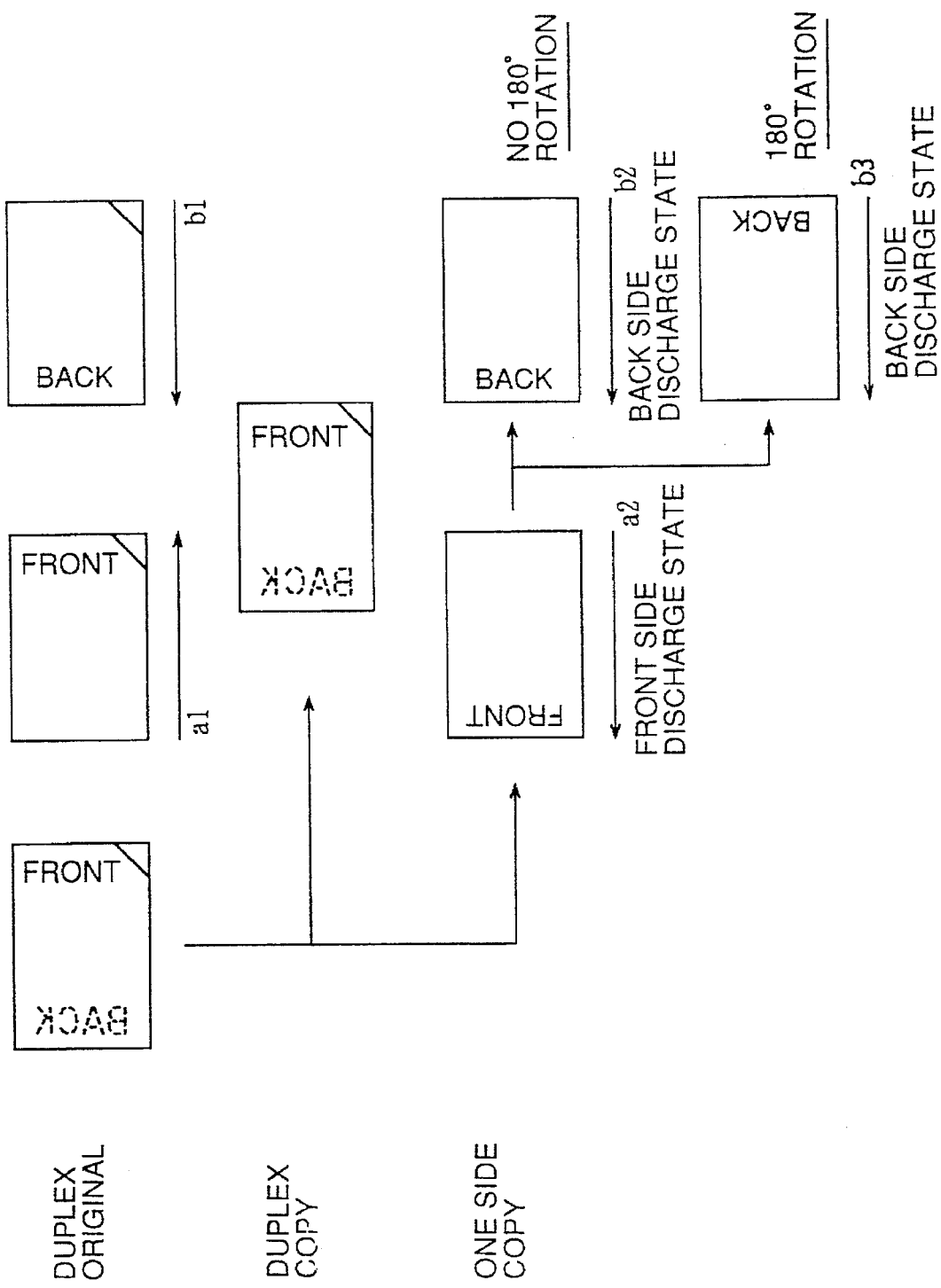

As shown in FIG. 8, consider the case where an original having "front" and "back" written on both sides, respectively, is printed on each side of two papersheets.

When the duplex original is copied using copying apparatus 1 shown in FIG. 1, the duplex original is first set on original feeding tray 500 with the side on which "front" is written facing up. First, an image on the front side is read out in the direction of an arrow from a point a1 as shown in FIG. 8. The image is printed on one side of a papersheet fed from paper cassette 80a or 80b in the direction of an arrow from a point a2, and the papersheet is discharged outside.

Then front and back sides of the original are reversed by reversing roller 507. The original is again set on platen glass 18, and the image is read out in the direction of an arrow from a point b1. The image is printed on another papersheet newly fed from the paper cassette. If the image is printed in the direction of an arrow from the point b2 without applying the rotation processing, the second papersheet is discharged with top and bottom reversed with respect to the first papersheet.

In order to solve the problem, the image of the back side is printed in the direction of an arrow from a point b3 after being subjected to the 180° rotation processing. As a result, the first papersheet and the second papersheet can be discharged with the images headed in one direction as shown in the figure.

In the above-described example, the 180° rotation processing was carried out with respect to the printing of the back side. However, the similar effect can be obtained by carrying out the 180° rotation processing with respect to the printing of the front side in advance.

In the duplex original→duplex copy mode, the reading direction of the back side of the original and the printing direction of the back side of the papersheet are opposite with respect to the front side, it is not necessary to apply such processing as required in the duplex original→one side copy mode.

Operations of copying apparatus 1 will now be described with reference to flow charts. Main routines which CPU 1 to 8 carry out will be first described in order, and then subroutines carried out in respective main routine will be described.

Figure 9:
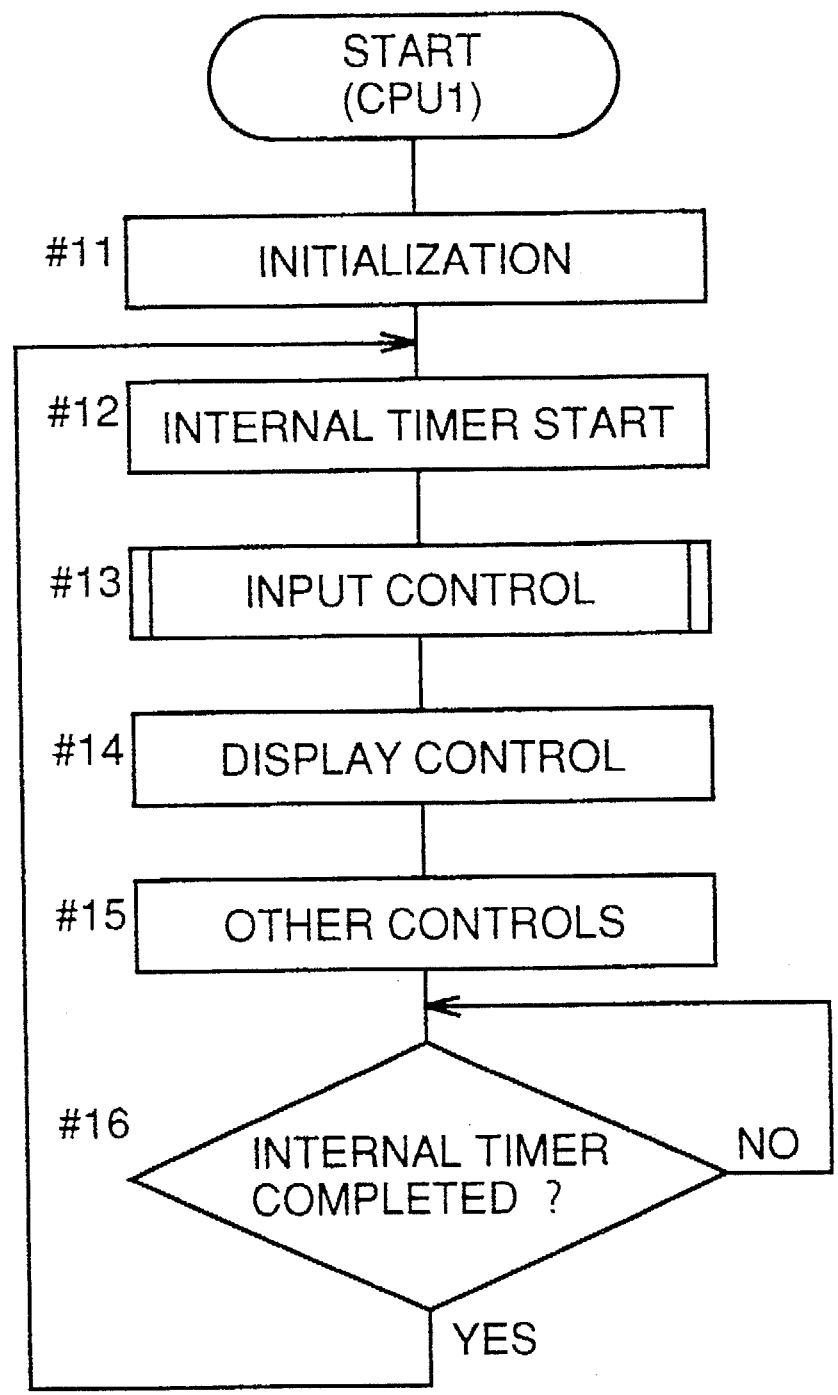
FIG. 9 is a flow chart showing a main routine carried out by a CPU 1.

FIG. 9 is a flow chart of the main routine of CPU 1. After initialization is carried (step #11), an internal timer is started to monitor a constant routine time (steps #12, 16). An input control processing and a display control processing are carried out with respect to operation panel OP or the like (steps #13, 14). Other processings are carried out (step #15). Communication between other CPUs 2 to 8 and CPU 1 is carried out by the interrupt processing.

Figure 10:
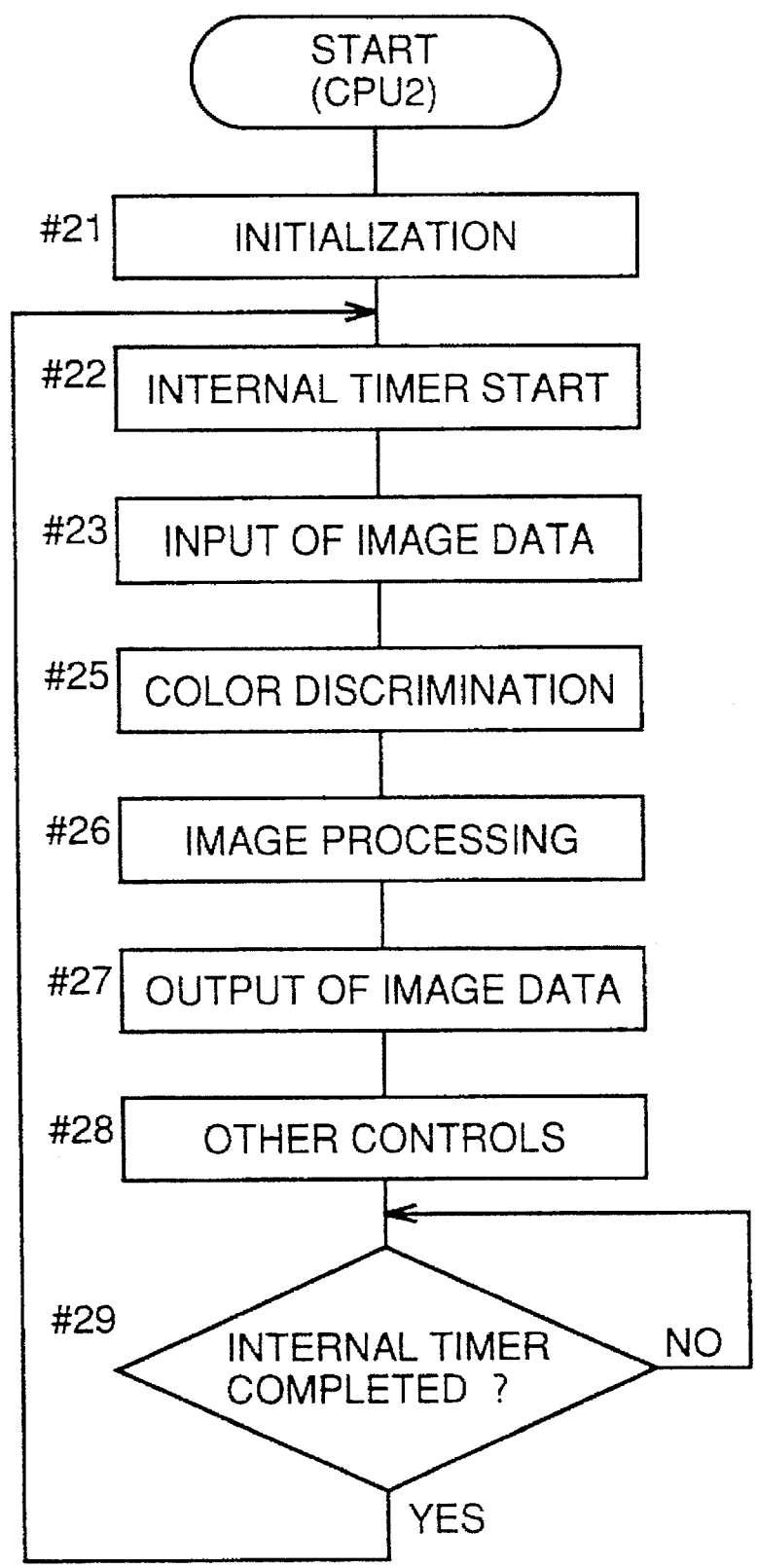
FIG. 10 is a flow chart showing a main routine carried out by a CPU 2.

FIG. 10 is a flow chart of the main routine of CPU 2.

After image data is inputted (step #23), a color discrimination processing, an image processing, an output processing of the image data, and other processings are carried out (steps #25 to 28).

Figure 11:
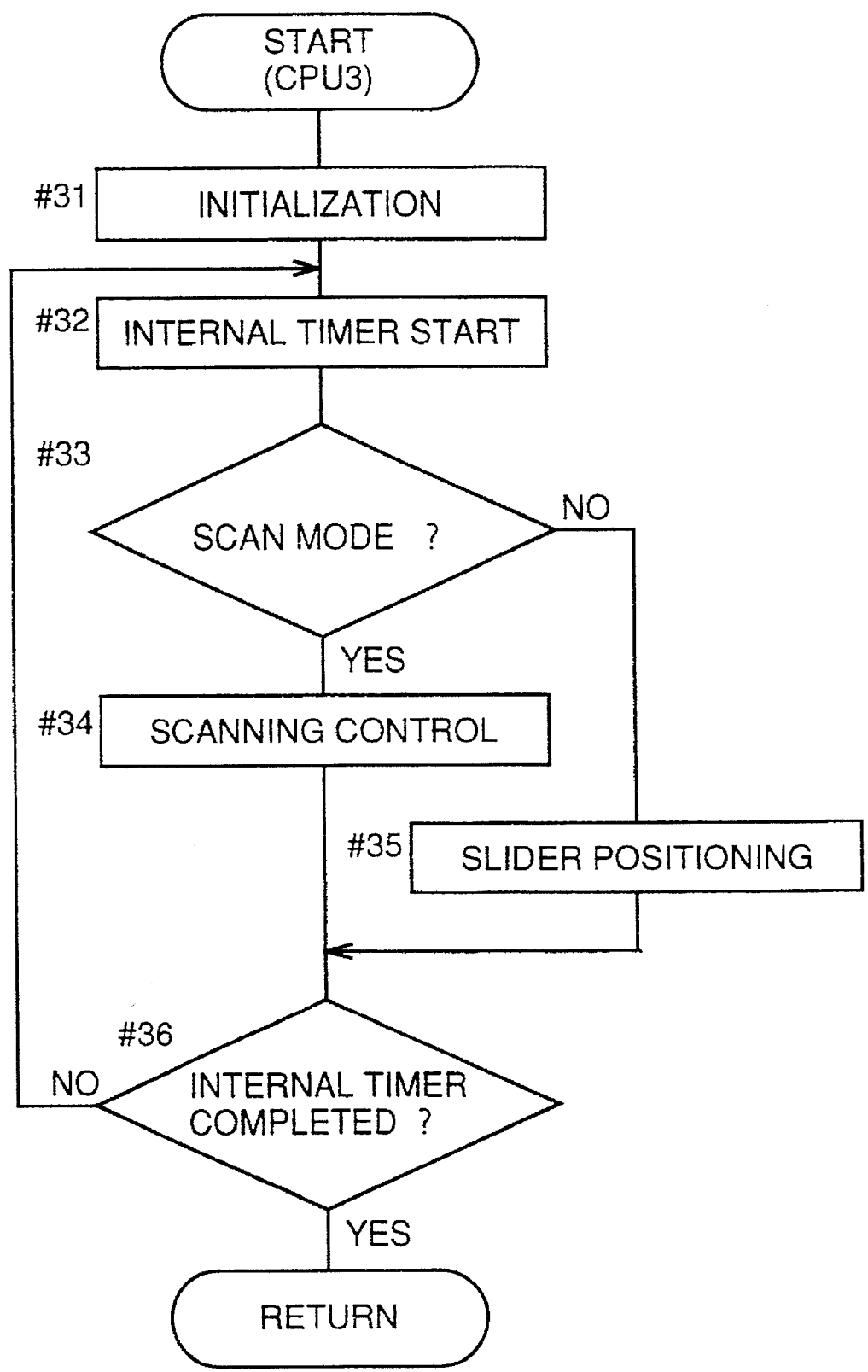
FIG. 11 is a flow chart showing a main routine carried out by a CPU 3.

FIG. 11 is a flow chart of the main routine of CPU 3.

CPU 3 controls scanning system 10. In the case of the scan mode (YES at step #33), scanning control for making scanner 19 move is carried out (step #34). In the case of the original traveling mode (NO at step #33), a slider positioning control is carried out (step #35).

Figure 12:
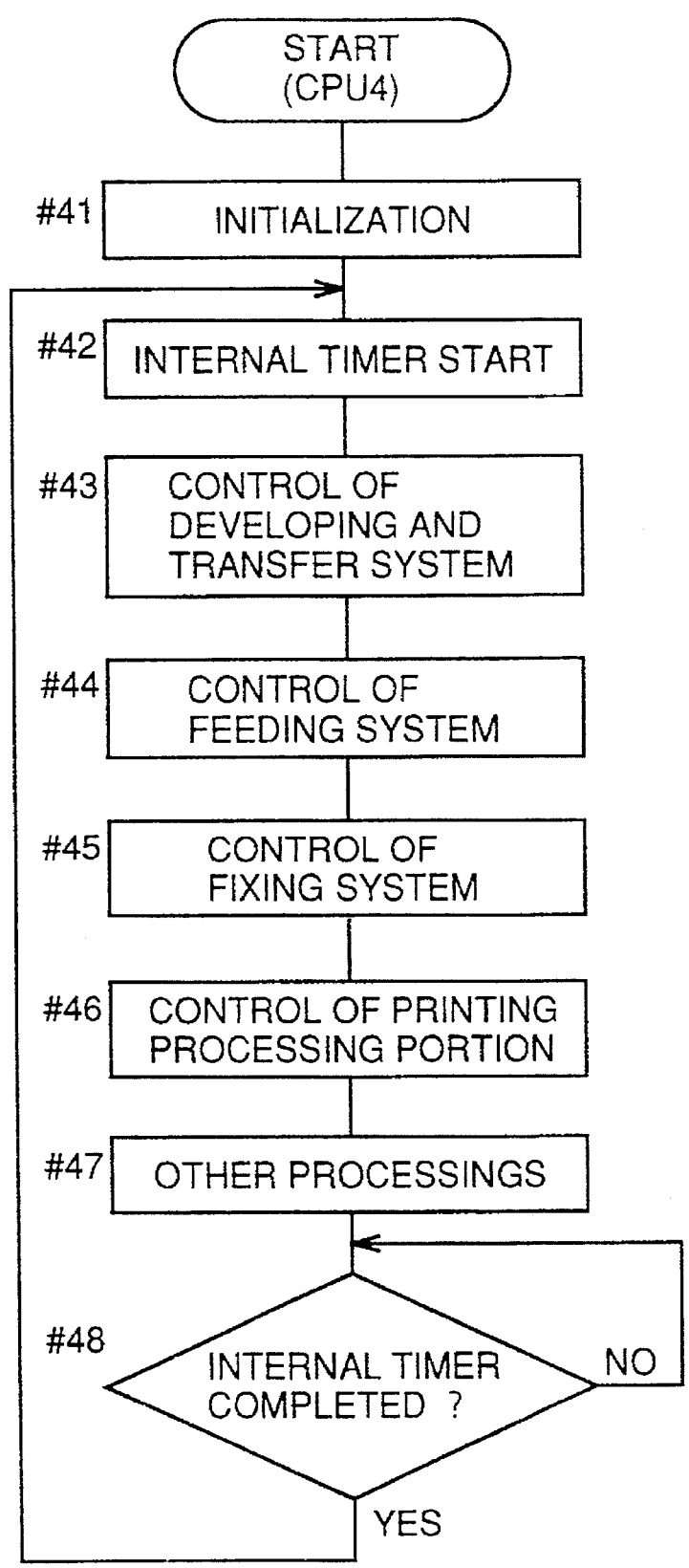
FIG. 12 is a flow chart showing a main routine carried out by a CPU 4.

FIG. 12 is a flow chart of the main routine of CPU 4.

CPU 4 controls printer PRT. CPU 4 controls developing and transfer system 70A (step #43), controls feeding system 70B (step #44), controls fixing system 70C (step #45), controls printing processing portion 40 (step #46), and carries out other processings (step #47).

In the control at the above step #44, after the paper size is detected by size detecting sensors SE11, 12, the paper refeed path length, the distance between papersheets, and the paper size are calculated by CPU 4. The number M of papersheets capable of being stacked through the refeeding path is determined based on the calculated result. Since the paper refeed path length and the distance between papersheets are constant, the number of papersheets to be fed through the refeeding path is determined based on the detected paper size.

Figure 13:
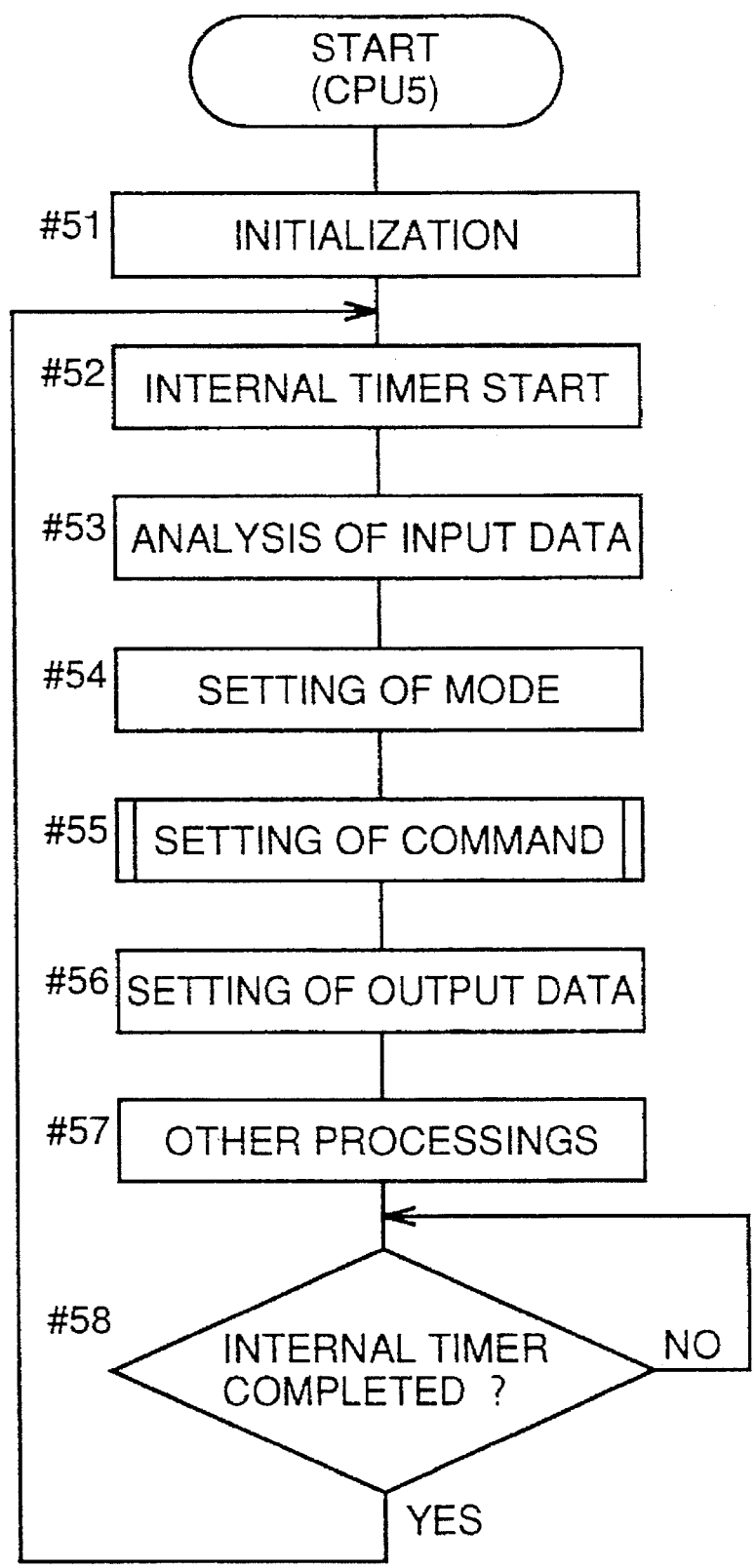
FIG. 13 is a flow chart showing a main routine carried out by a CPU 5.

FIG. 13 is a flow chart of the main routine of CPU 5.

CPU 5 gives commands of activation and stop and sets an operation mode with respect to other CPUs to control the overall operation of copying apparatus 1. After checking data inputted by communication by interrupt, CPU 5 analyzes the contents. When the operation mode is changed depending on the contents, CPU 5 carries our the mode setting processing (steps #51 to #54).

Memory writing and reading control depending on the copy mode is carried out by command setting at step #55. The data is set in an output area for output by communication (step #56).

Figure 14:
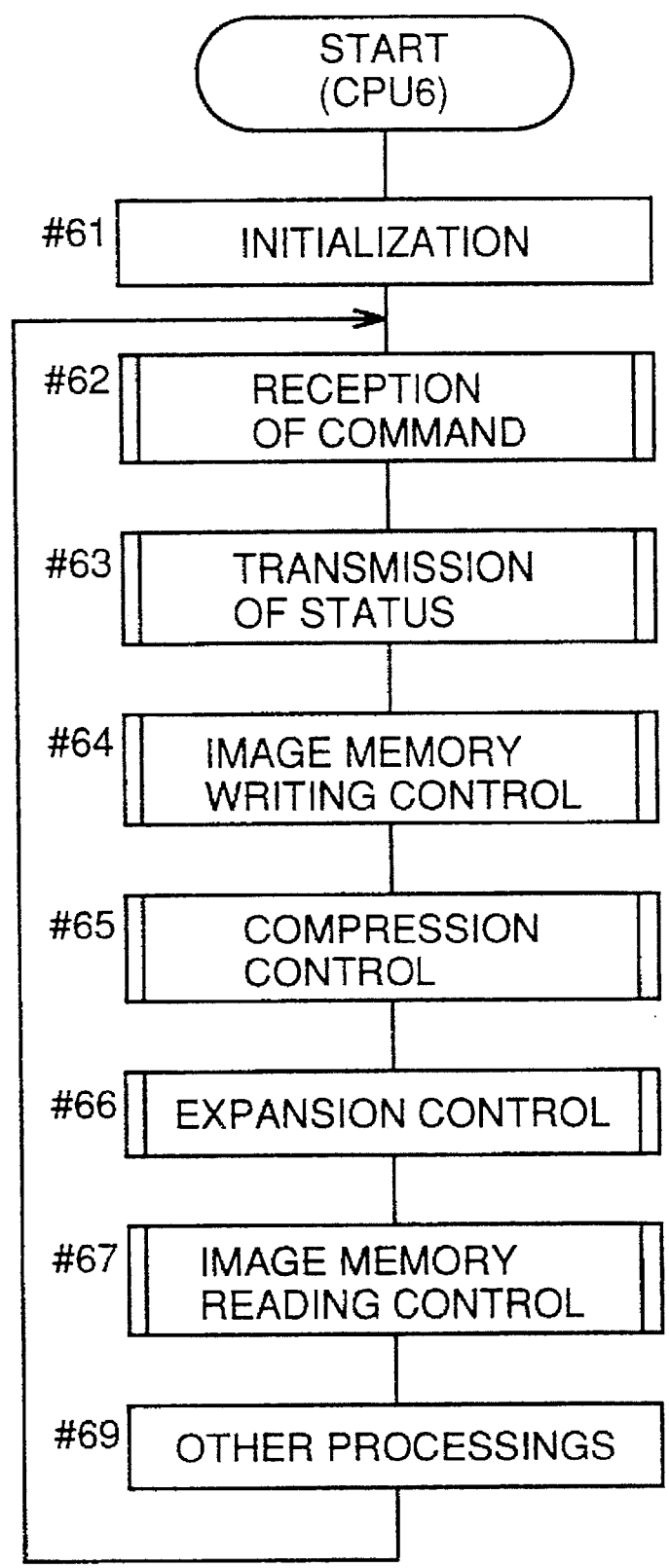
FIG. 14 is a flow chart showing a main routine carried out by a CPU 6.

FIG. 14 is a flow chart of the main routine of CPU 6.

CPU 6 controls memory unit portion 30. CPU 6 carries out a receiving processing of commands from other CPUs (step #62), carries out a status transmitting processing (step #63), carries out writing control into image memory 304 (step #64), carries out compression control (step #65), carries out expansion control (step #66), and carries out reading control from image memory 304 (step #67).

Figure 15:
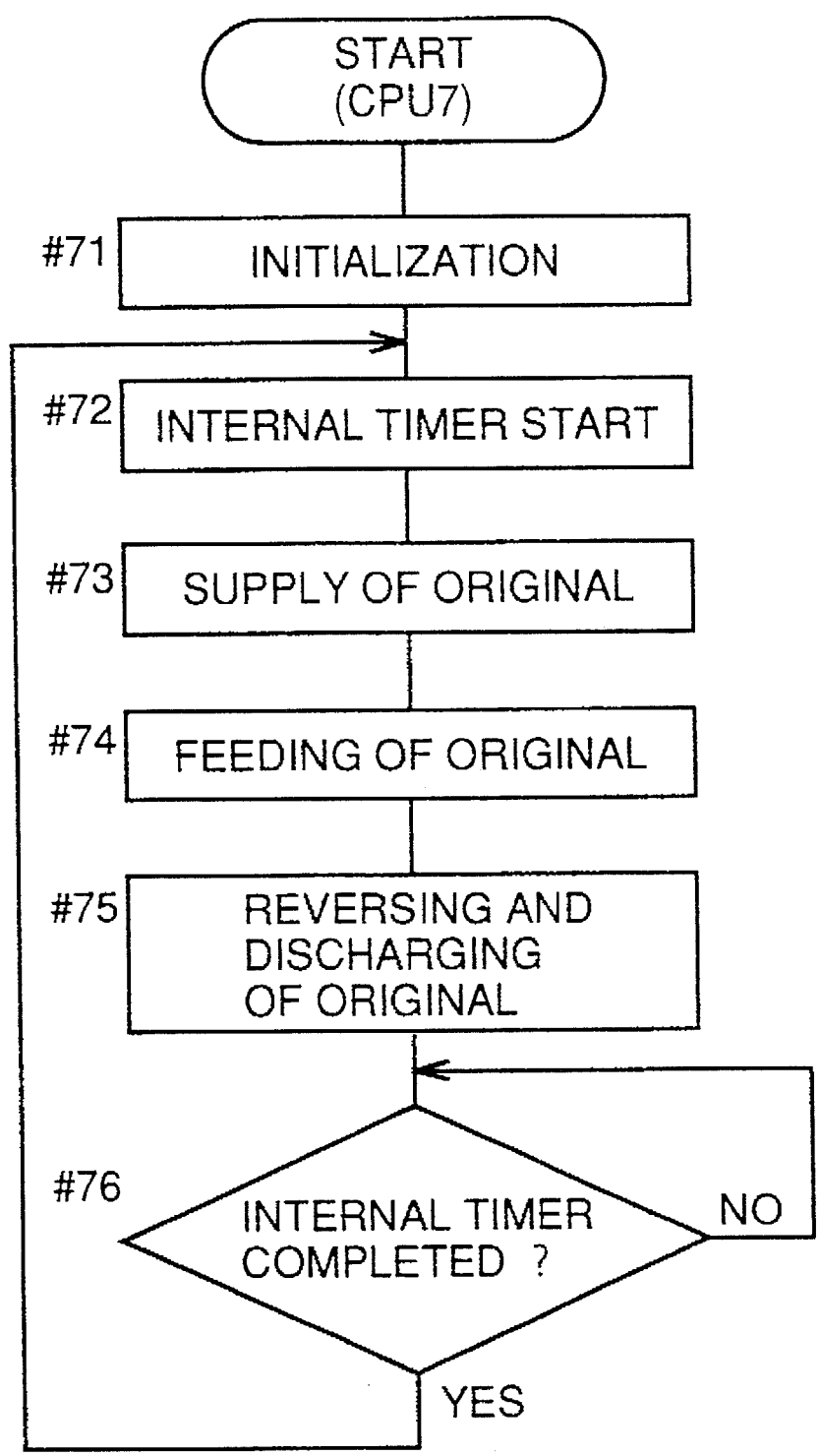
FIG. 15 is a flow chart showing a main routine carried out by a CPU 7.

FIG. 15 is a flow chart of the main routine of CPU 7.

CPU 7 controls original feeding portion 500. In the control, an original feeding processing is carried out for sorting and registering originals and feeding the originals up to transport belt 506 (step #73). An original feeding processing is carried out for positioning the originals to a predetermined reading position and feeding the originals up to reversing roller 507 by transport belt 506 (step #74). An original reverse/discharge processing is carried out for directly discharging the original reaching reversing roller 507, refeeding the same toward transport belt 506 or the like (step #75).

Figure 16:
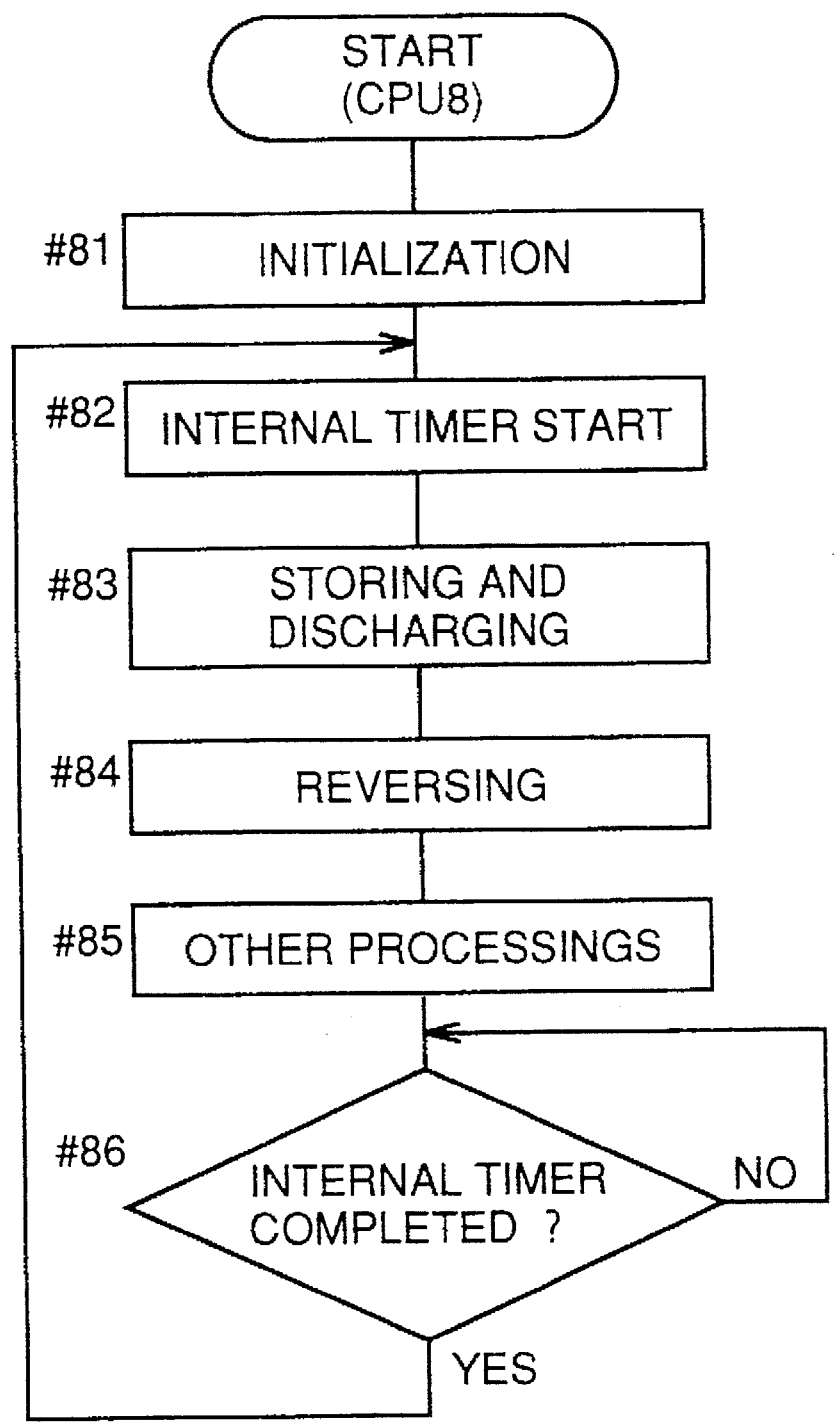
FIG. 16 is a flow chart showing a main routine carried out by a CPU 8.

FIG. 16 is a flow chart of the main routine of CPU 8.

CPU 8 controls paper refeeding portion 600. In order to carry out printing onto the back side of the printed papersheet discharged from image forming system 70, a store/discharge processing is carried out for once storing or directly discharging the papersheet to discharge tray 621 (step #83), and a reversing processing is carried out for reversing front and back sides of the stored papersheet (step #84).

In the store/discharge processing, whether or not the papersheet is discharged from image forming system 70 is detected by discharge sensor SE62 provided at the discharge outlet. During discharge, feeding roller 602 is rotated, and feeding roller 602 is halted a predetermined time after completion of discharge.

In the reversing processing, while reversing sensor SE61 detects the papersheet, reversing roller 603 is normally rotated. At the time when reversing sensor SE61 is turned off, reversing roller 603 is reversed and halted after a predetermined time.

Figure 17:
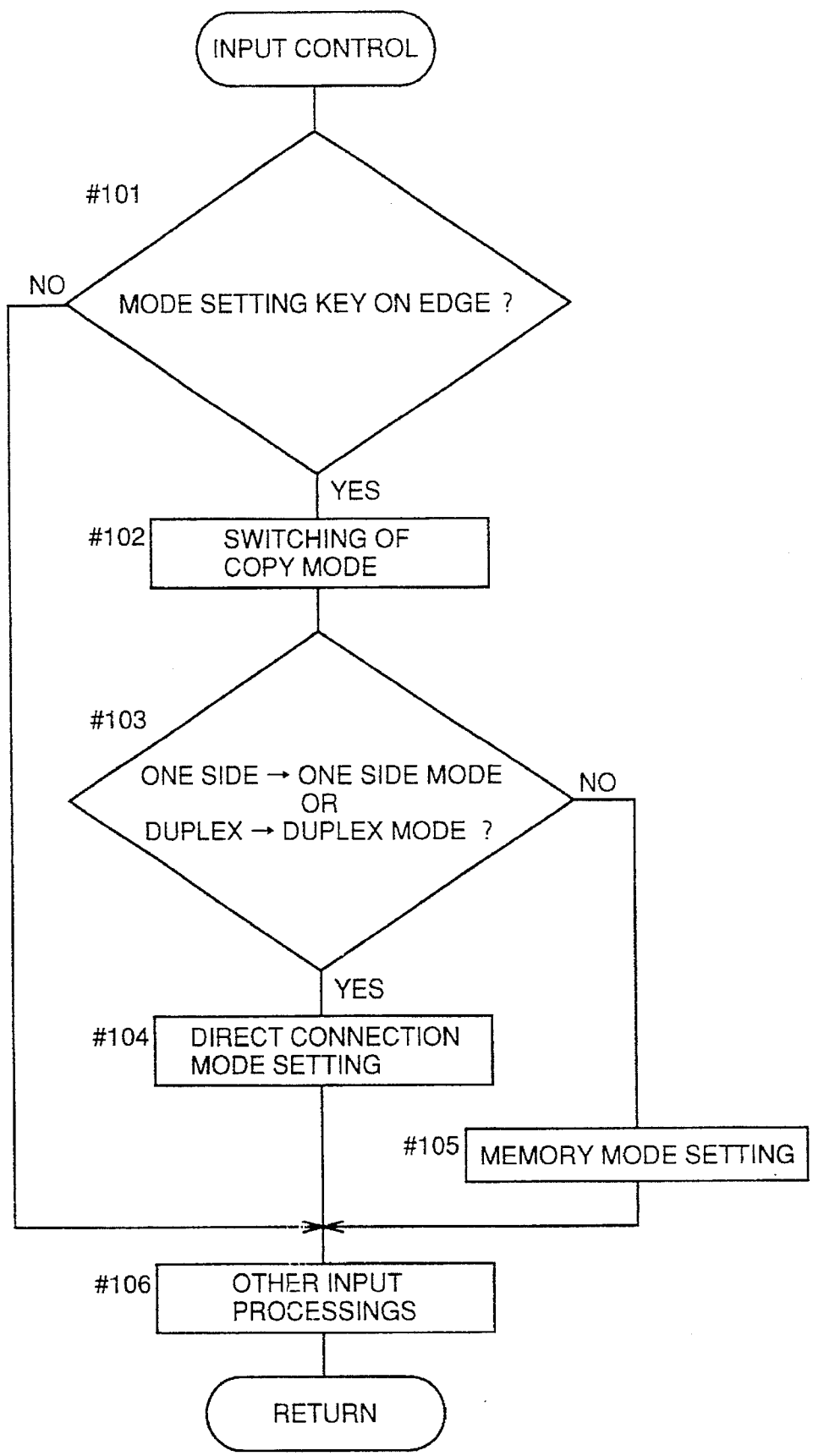
FIG. 17 is a flow chart showing an input control subroutine.

FIG. 17 is a flow chart of an input control subroutine shown at step #13 of FIG. 9.

Whenever on edge of a mode setting key 97 is detected (YES at step #101), respective copy modes of "one side original→one side copy mode", "duplex original→one side copy mode", "one side original→duplex copy mode", and "duplex original→duplex copy mode" are sequentially switched, and corresponding mode display portions 97a to 97d are lit up.

In the case of "one side original→one side copy mode" or "duplex original→duplex copy mode" (YES at step #103), the direct connection mode is set (step #104).

In the case of "duplex original→one side copy mode" or "one side original→duplex copy mode" (NO at step #103), the memory mode is set (step #105).

When on edge of mode setting key 97 is not detected, the procedure moves to step #106 to carry out a key input processing of a ten key or the like, excluding mode setting key 97.

Figure 18:
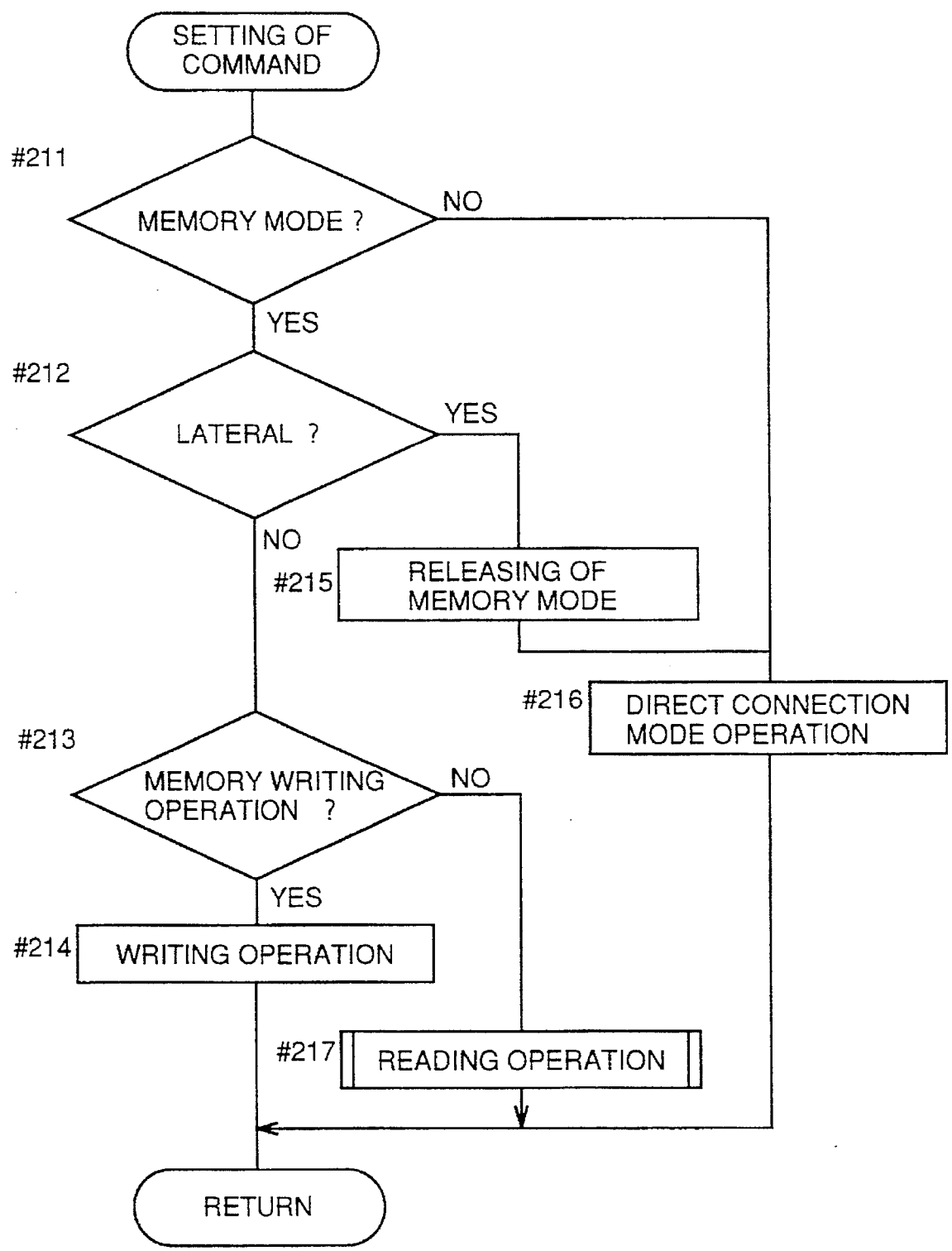
FIG. 18 is a flow chart showing a subroutine of command setting.

FIG. 18 is a flow chart of the subroutine of a command setting processing shown at step #55 of FIG. 13.

In the case of the memory mode (YES at step #211), it is checked whether the original is a longitudinal original whose feeding direction coincides with its longer direction or a lateral original whose feeding direction coincides with its shorter direction at step #212. In the case of a longitudinal original (NO at step #212), an operation mode of the memory is determined at step #213. When the memory writing operation is set (YES at step #213), a command necessary for the memory writing operation is set (step #214). When the memory reading operation is set (NO at step #213), a command necessary for the memory reading operation is set (step #217).

When it is determined that the original is a lateral original at step #212, the memory mode is released at step #215. In the case of the direct connection mode (NO at step #211 or YES at step #212), a command necessary in the direct connection mode is set (step #216).

In the case of the memory mode ("one side original→duplex copy" or "duplex original→one side copy"), the memory writing operation is first carried out. When reading of all pages and writing into the memory are completed, the memory reading operation is then carried out.

Figure 19:
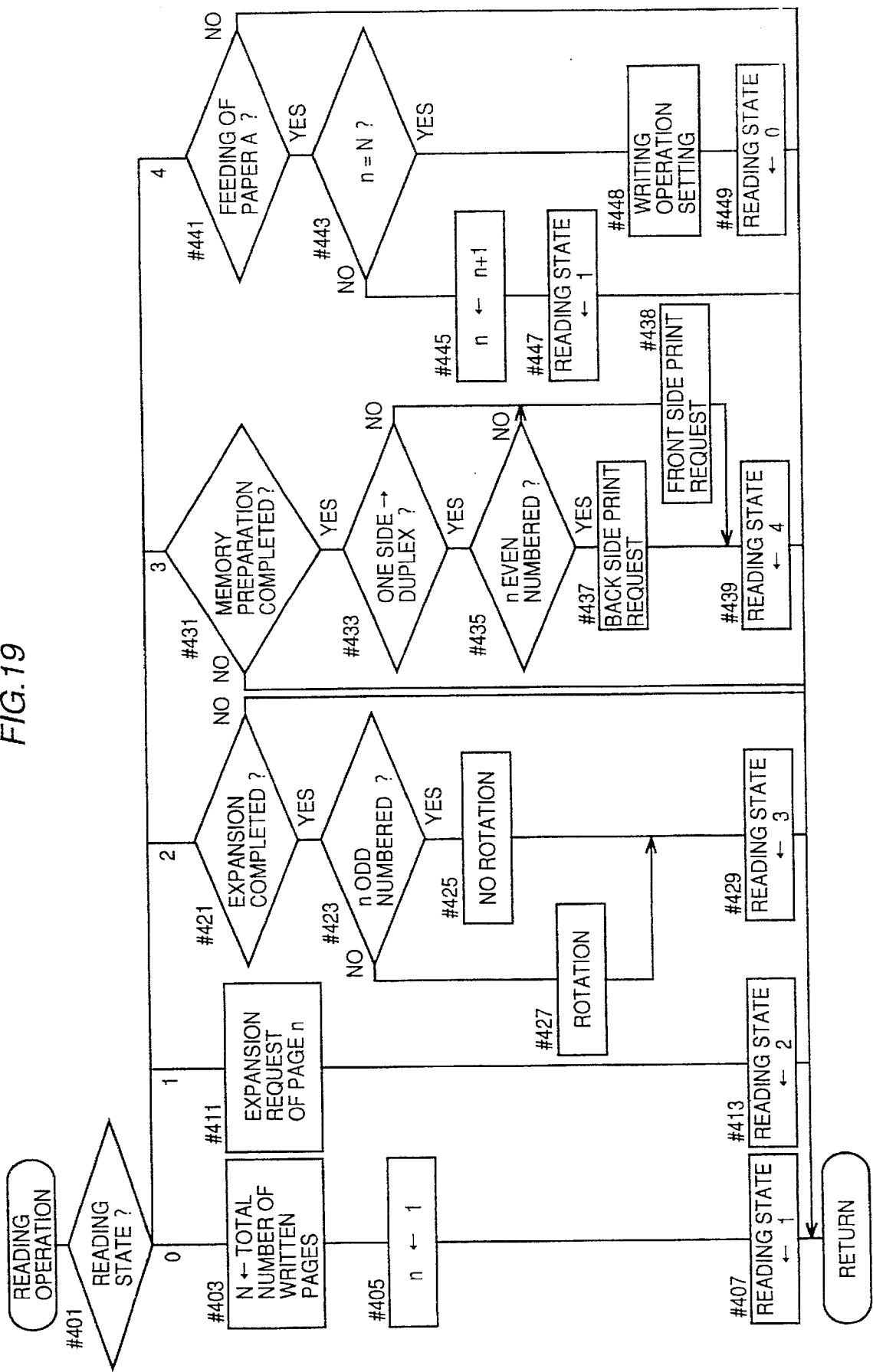
FIG. 19 is a flow chart showing a reading operation subroutine.

FIG. 19 is a flow chart of a subroutine showing command setting of the memory reading operation in "one side original→duplex copy mode" or "duplex original→one side copy mode" shown at step #217 of FIG. 18. As shown in FIGS. 7 and 8, respective request signals such as expansion, memory preparation, printing or the like are provided so that a copied papersheet is discharged with images on front and back sides headed in one direction in the case of the duplex copy mode, and so that the discharge direction of a copied papersheet first discharged and the top and bottom direction of a copied papersheet second discharged are the same in the case of the one side copy mode.

In response to values of the reading state, at step #401, the procedure is branched into step #403 (when the value is "0"), step #411 (when the value is "1"), step #421 (when the value is "2"), step #431 (when the value is "3"), and step #441 (when the value is "4").

When the reading state is "0", the total number of written pages is substituted for a variable N (step #403). Then a variable showing the number of pages read out is initialized (step #405). The reading state is updated (step #407).

When the reading state is "1", an expansion request of the page number n is sent to CPU 6 (step #411). The reading state is updated (step #413). When the expansion request signal is provided, CPU 6 reads out data of the page number n from coding memory 306 and expands the same, and carries out control for writing the data into image memory 304.

When the reading state is "2", it is determined whether or not an expansion completion signal is received from CPU 6 (step #421). When the expansion completion signal is received (YES at step #421), it is determined whether the page number is an odd number or an even number. When the page number is an odd number (YES at step #423), CPU 6 gives an instruction of "no rotation" to rotation processing portion 307 (step #425). When the page number is an even number (NO at step #423), CPU 6 gives an instruction of "rotation" to rotation processing portion 307 (step #427).

In the case of "rotation", a memory in an image memory is read out upon 180° rotation through rotation processing portion 307 shown in FIG. 5 at the time of printing.

Description will now be given of the case where the reading state is "3". When a memory preparation completion signal is received from CPU 6 (YES at step #431), it is determined whether or not the copy mode is one side or duplex. In the case of the one side copy mode (NO at step #433), a front side print request signal is sent to CPU 4 and CPU 6 (step #438). In the case of the duplex copy mode (YES at step #433), when "n" showing the page number is an even number (YES at step #437), a back side print request signal is transmitted, and when "n" is an odd number (NO at step #437), a front side print request signal is transmitted. CPU 4 makes control for feeding a papersheet from a paper cassette upon the front side print request, and for refeeding a papersheet from a paper refeed cassette upon the back side print request. Then, image data is read out from image memory 304, and a printing operation is carried out.

When the reading state is "4", it is determined whether or not all printing is completed at step #443 upon reception of a signal (paper feed A signal) showing completion of a predetermined paper feeding operation (YES at step #441). When the printing is not completed (NO at step #443), 1 is added to n (step #445). The reading state is set to "1" (step #447), and the processing similar to the above is repeated. When the printing is completed (YES at step #443), the writing operation mode is set (step #448), and the reading state is reset (step #449).

A modification of the first embodiment will now be described.

In the above description of the embodiment, a method was described of making copied papersheets arranged in the same top and bottom direction by applying the 180° rotation processing to every other original when image data read out in the image reading portion is once stored and outputted in "one side original→duplex copy" and "duplex original→one side copy" modes.

As for another embodiment, it is possible to rotate an image by 180° and output the same by reversely scanning one of an odd numbered page or an even numbered page in the case of the one side original, and one of the front side or the back side in the case of the duplex original in reading out the image by the image reading portion in the direct connection mode without using a memory. As a result, the effect similar to that of the present invention can be expected in the direct connection mode without using an expensive memory.

(2) Second Embodiment

The second embodiment of the present invention will now be described.

Figure 20:
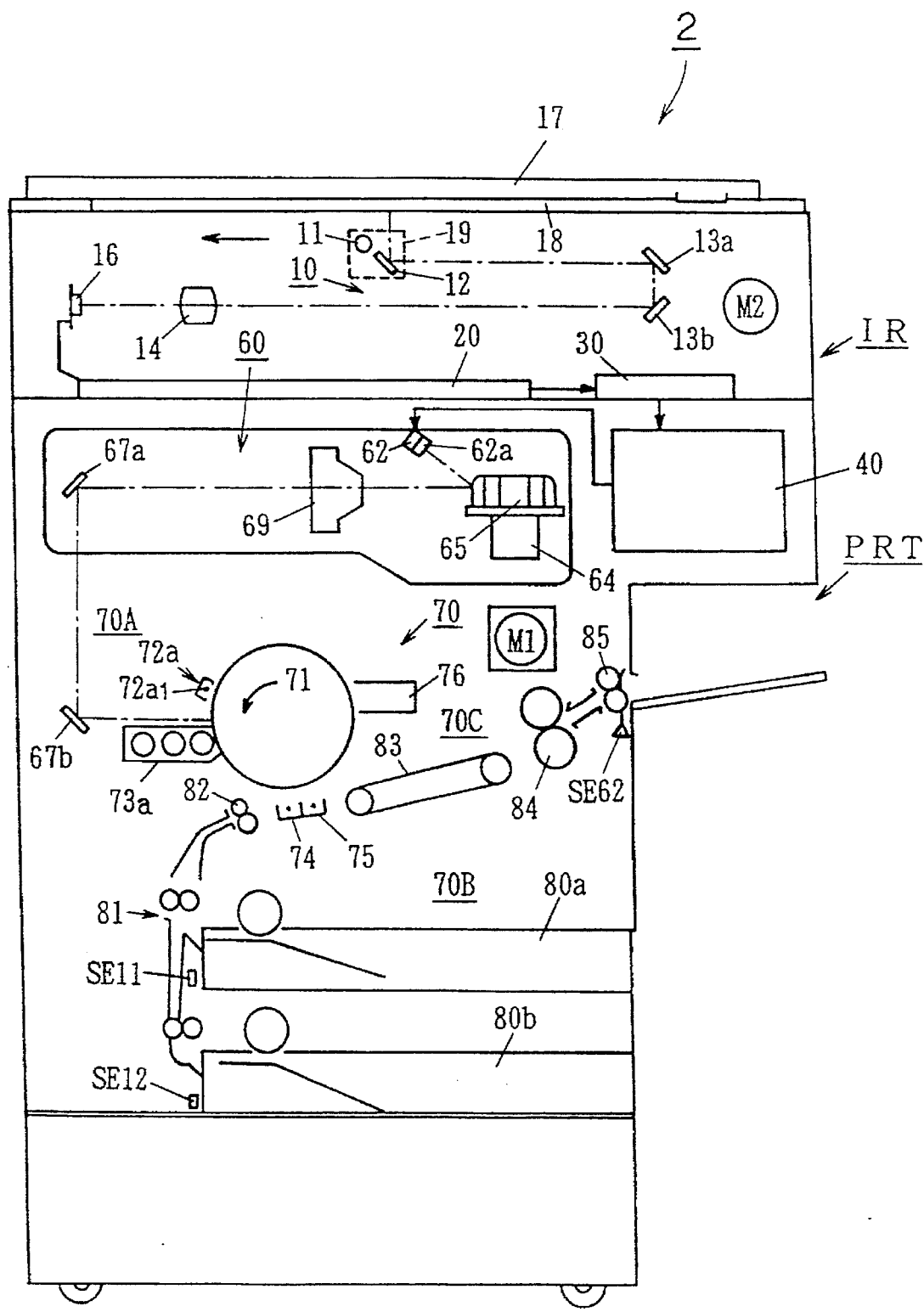
FIG. 20 is a cross sectional view of a copying apparatus to which a second embodiment is applied.

FIG. 20 is a cross sectional view showing the entire configuration of copying apparatus 1 in which an image processing apparatus according to the second embodiment is implemented.

In the second embodiment, original feeding portion 500 and paper refeeding portion 600 of the copying apparatus of the first embodiment are omitted. Since other portions are basically the same as those of the first embodiment, description will be given only of portions different from those of the first embodiment.

Figure 21:
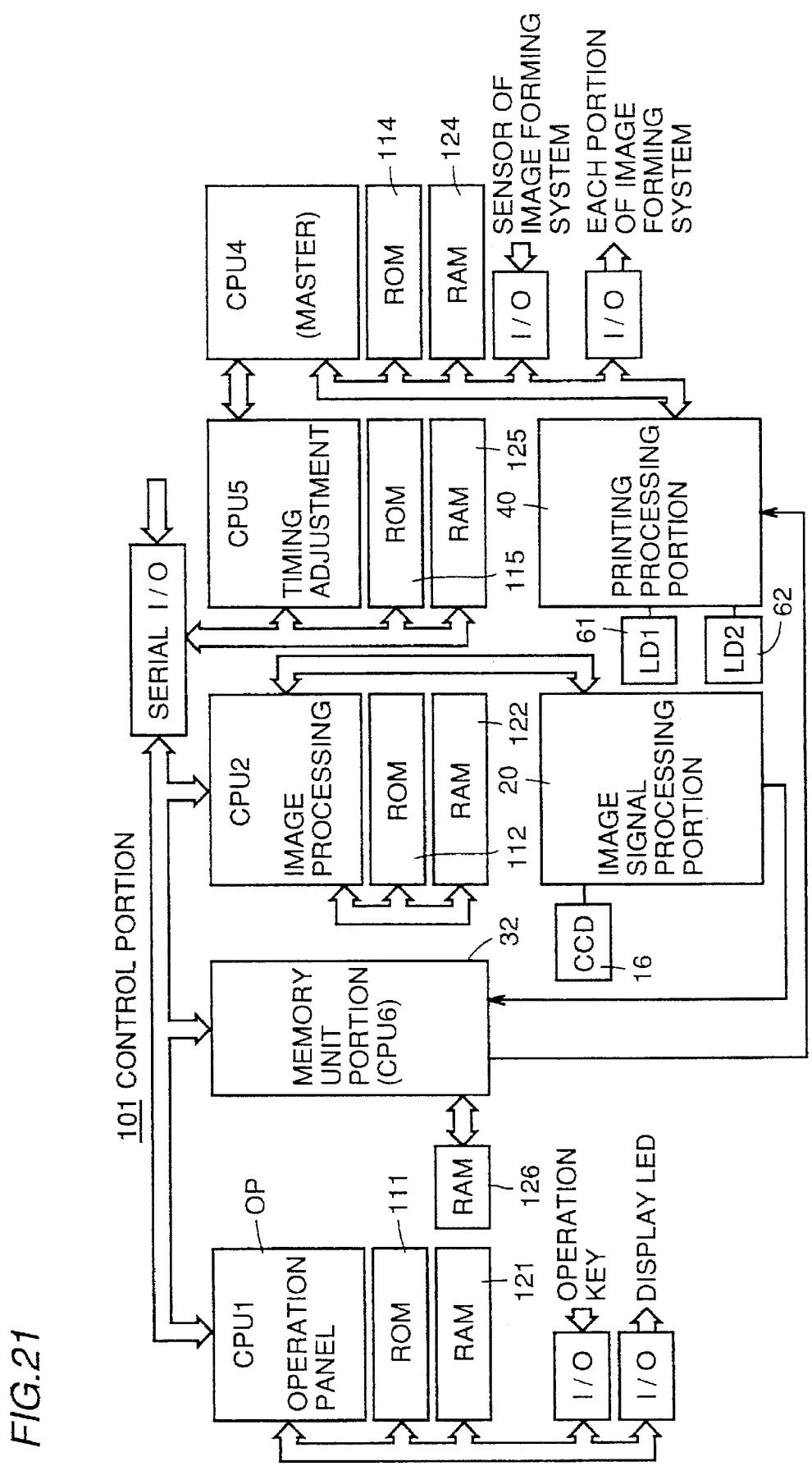
FIG. 21 is a block diagram showing a configuration of a control portion of the copying apparatus of the second embodiment.

FIG. 21 is a block diagram showing a configuration of a control portion 101 of copying apparatus 1 according to the second embodiment. Since control portion 101 in the second embodiment is basically the same as the first embodiment except that control portion 101 does not include a control portion relating to original feeding and paper refeeding, the description thereof will not be repeated.

Figure 22:
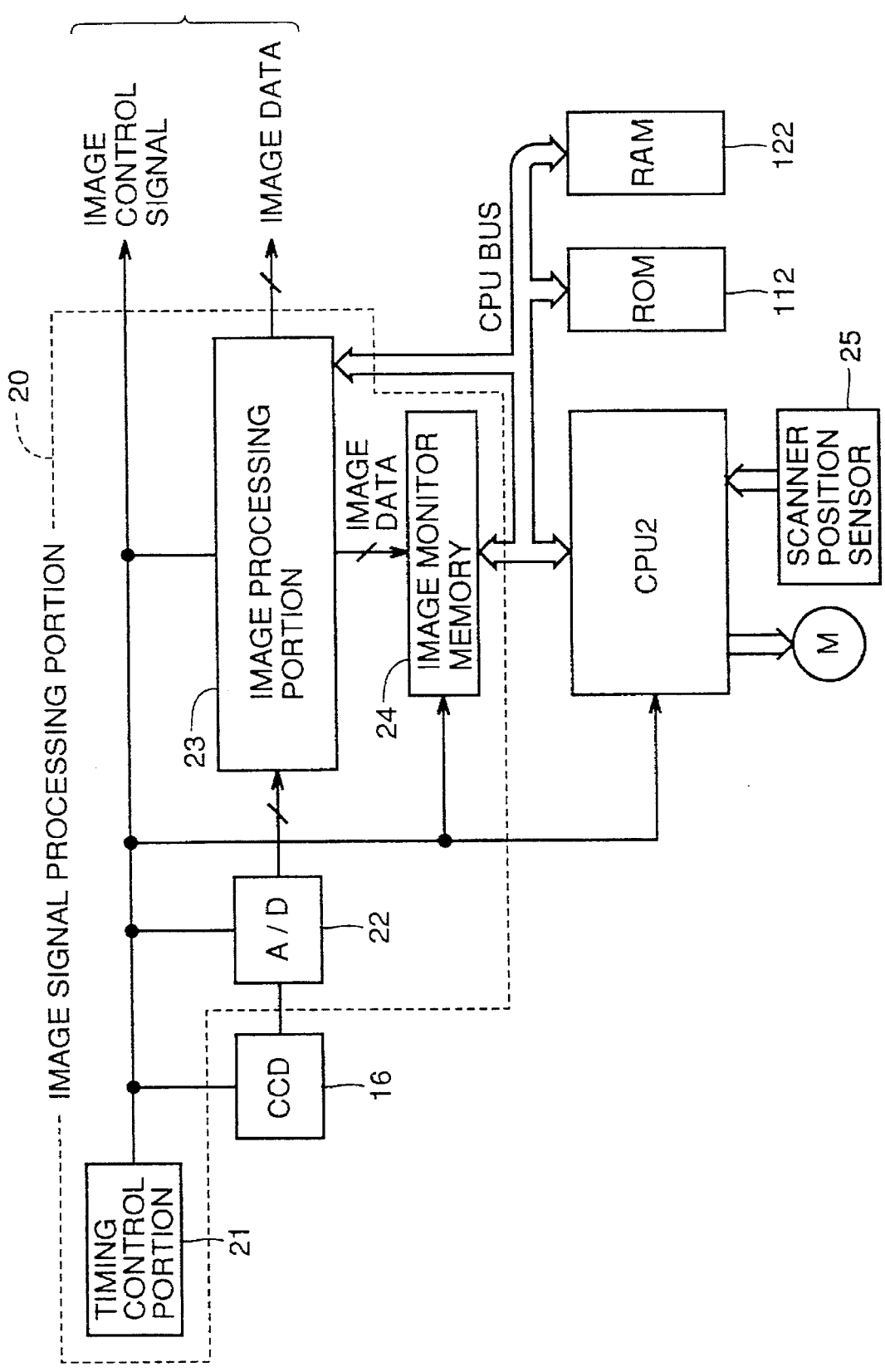
FIG. 22 is a block diagram showing a configuration of an image reader IR.

Description will now be given of image reader IR and image signal processing portion 20. FIG. 22 is a block structural diagram of image reader IR. CPU 2, ROM 112, RAM 122, and CCD 16 correspond to those of FIG. 21.

An image reading synchronizing signal is supplied to each block from a timing control portion 21. CCD 16 scans the original in the main scanning direction to generate an original reading signal. The generated signal is converted into a digital signal in an A/D converting portion 22 to be sent to an image processing portion 23. Image processing portion 23 carries out processings such as image quality correction such as shading correction, MTF correction, gamma correction or the like, variable-scale magnification, image editing. The image data is supplied to a printer engine portion or an image memory unit.

An image monitor memory 24 stores image data for one line upon an instruction of CPU 2. CPU 2 carries out the overall control of the image reader such as setting of parameters to image processing portion 23, scan control by scanner motor driving, communication with host CPU 5, or the like.

Description will now be given of a method of sensing the original size and whether the original being a longitudinal original or a lateral original. In this specification, the original mounted so that the longer side thereof is approximately parallel to the feeding direction of a papersheet is called "longitudinal original", and an original mounted so that the longer side thereof is approximately vertical to the feeding direction of a papersheet is called "lateral original". By scanning the original with being covered with a mirror surface original cover 17 (cf. FIG. 20), if a white portion is sensed, it is determined that the portion is the original. The original may be scanned with original cover 17 open.

CPU 2 carries out a preliminary scanning as follows upon reception of an instruction of an original size detection operation by host CPU 5. CPU 2 controls a scanner motor M based on scanner position information from a scanner position sensor 25 to make scanner 19 scan in the subscanning direction. At the timing corresponding to the position of the subscanning direction, image data is stored in image monitor memory 24. Then, the image data is read out, and based on the contents of the image data and the monitor position information, the original size is detected, and the detected result is transmitted to host CPU 5.

Figure 23:
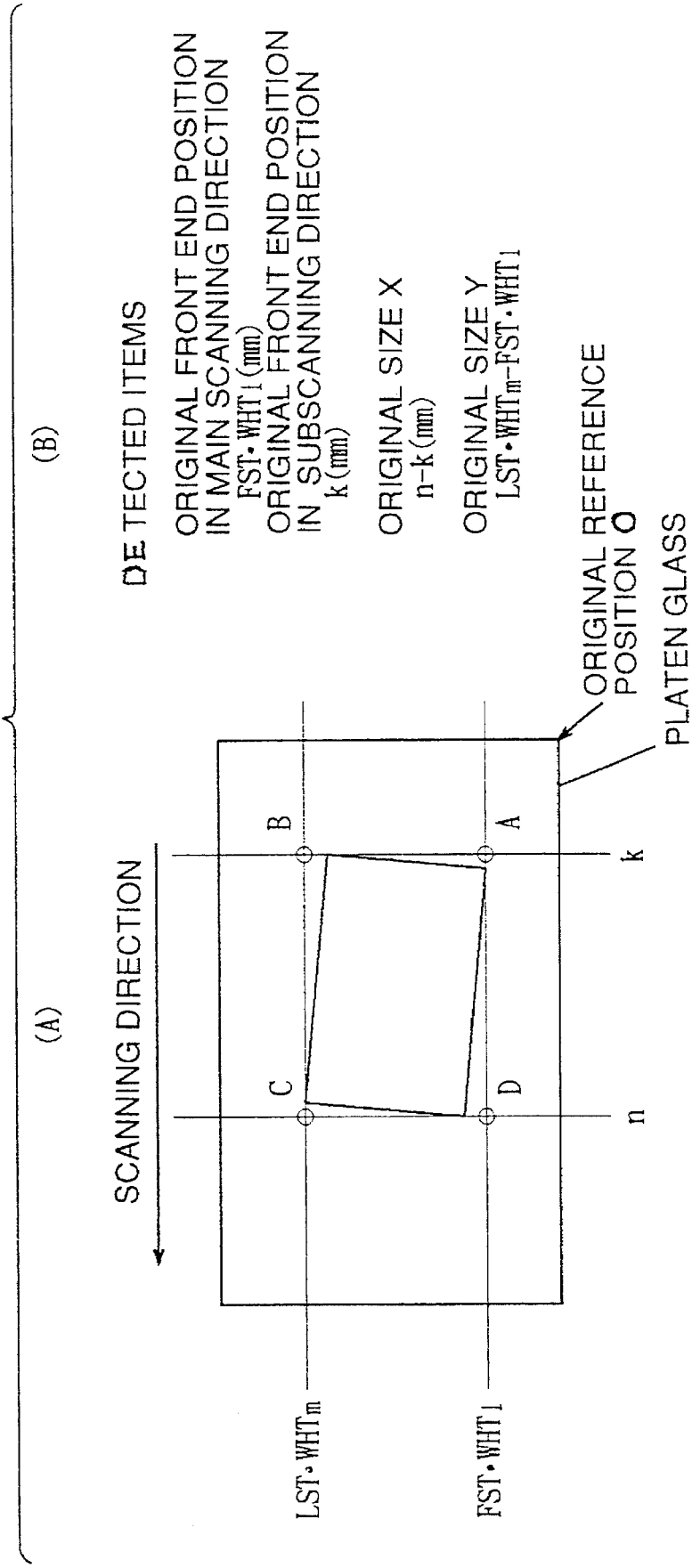
FIG. 23 is a diagram showing a method of detecting the size of an original.

FIG. 23 is a diagram for explaining a method of detecting the original size. (A) is a diagram showing the platen, and (B) shows an expression calculating the position and the original size detected during the preliminary scanning. FIG. 24 shows a buffer in which the detected data is stored.

Referring to FIGS. 23 and 24, CPU 2 stores a platen reference position O in advance. In the preliminary scanning, image scanning is carried out with respect to the entire surface of the platen. CPU 2 periodically stores image information in image monitor memory 24 during the preliminary scanning, and scans the image data from the reference position direction of the main scanning direction. An address (FST.WHT) at which the first white level is detected in the main scanning direction and an address (LST.WHT) at which the last white level is detected in the main scanning direction are stored in the buffer in correspondence with the subscanning position, as shown in FIG. 24. An address at which the white level cannot be detected is 0.

After completion of the preliminary scanning, the original size and the position are determined using the data stored in the buffer. Buffer is sequentially read out. An address k having data other than first 0 is an original front end position in the subscanning direction, and an address n having data other than the last 0 is an original back end position in the subscanning direction. The original size in the subscanning direction is (n–k).

The original position and the original size in the main scanning direction are determined as follows. The minimum value FST.WHT1 of FST.WHT of the buffer is regarded as the original front end position in the main scanning direction, and the maximum value LST.WHTm of LST.WHT is regarded as the original back end position in the main scanning direction. The original size in the main scanning direction is regarded as (LST.WHTm–FST.WHT1).

As described above, the position and the size of the original are detected. Based on the detected longitudinal and lateral sizes, regular sizes of the original are presumed and sizes approximate to the regular sizes are transmitted to host CPU 5.

At this time, whether the original being the longitudinal original or the lateral original can be sensed. CPU 5 creates an original management table DT1 as shown in FIG. 25 upon reception of the information. CPU 5 determines that the original is a lateral original when the original size Y is larger than the original size X, and a longitudinal original otherwise.

Figure 26:
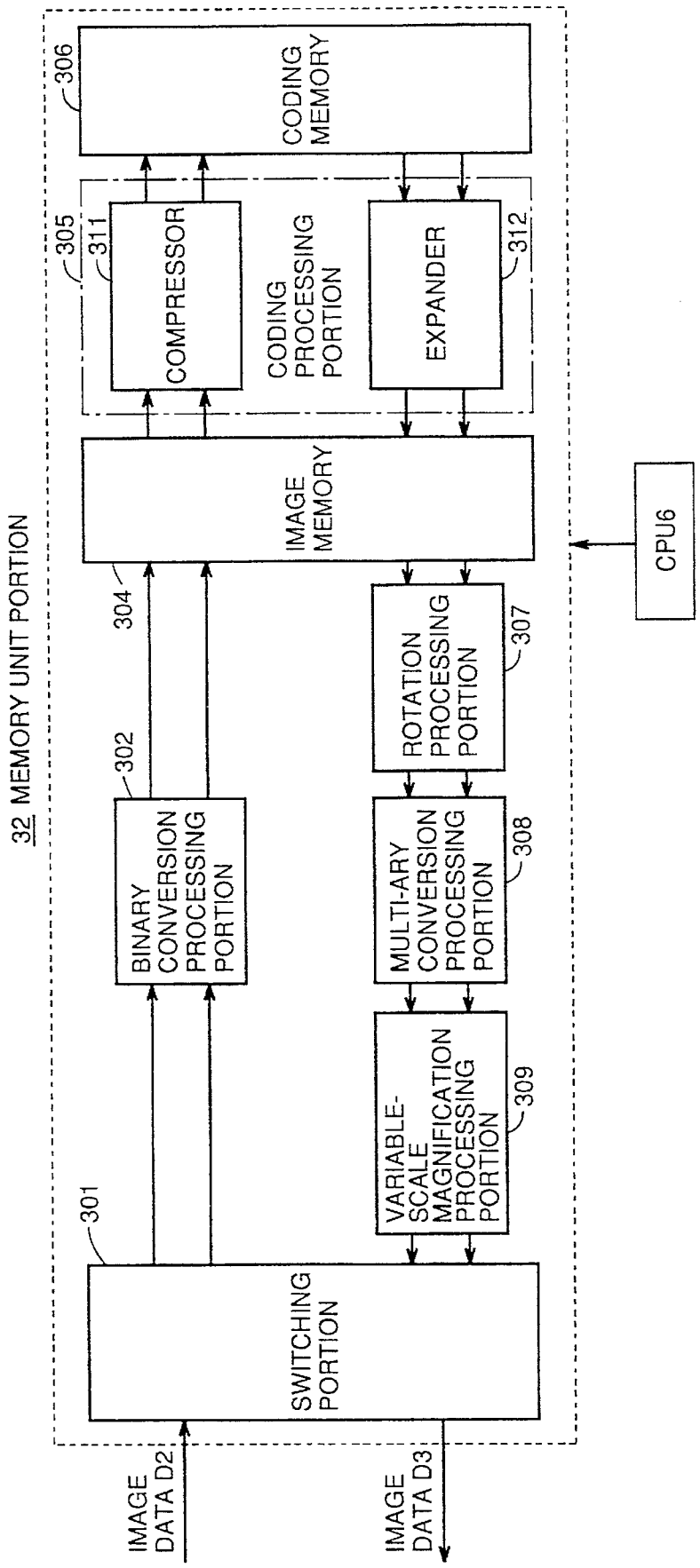
FIG. 26 is a block diagram showing a configuration of a memory unit portion.

A memory unit portion 32 will now be described. FIG. 26 is a block diagram of memory unit portion 32.

Memory unit portion 32 of the second embodiment is basically similar to memory unit portion 30 of the first embodiment except that a variable-scale magnification processing portion 309 is additionally included in memory unit portion 32.

In the second embodiment, when image data for one page is generated in image memory 304 by expansion, by calling the image data from image memory 304, reading out a character region in the image, and carrying out character recognition in the respective character directions of 0°, 90°, 180° and 270°, CPU 6 senses the direction of the character in the image, that is, the top and bottom direction of the image, and whether or not the image of the original being a landscape or a portrait. The detailed description thereof will follow.

Then, the image data is supplied to rotation processing portion 307. In rotation processing portion 307, the image data is rotated as necessary, multi-ary image data is created in multi-ary conversion processing portion 308, a variable-scale magnification processing is carried out, and the data is provided as image data D3.

Figure 27:
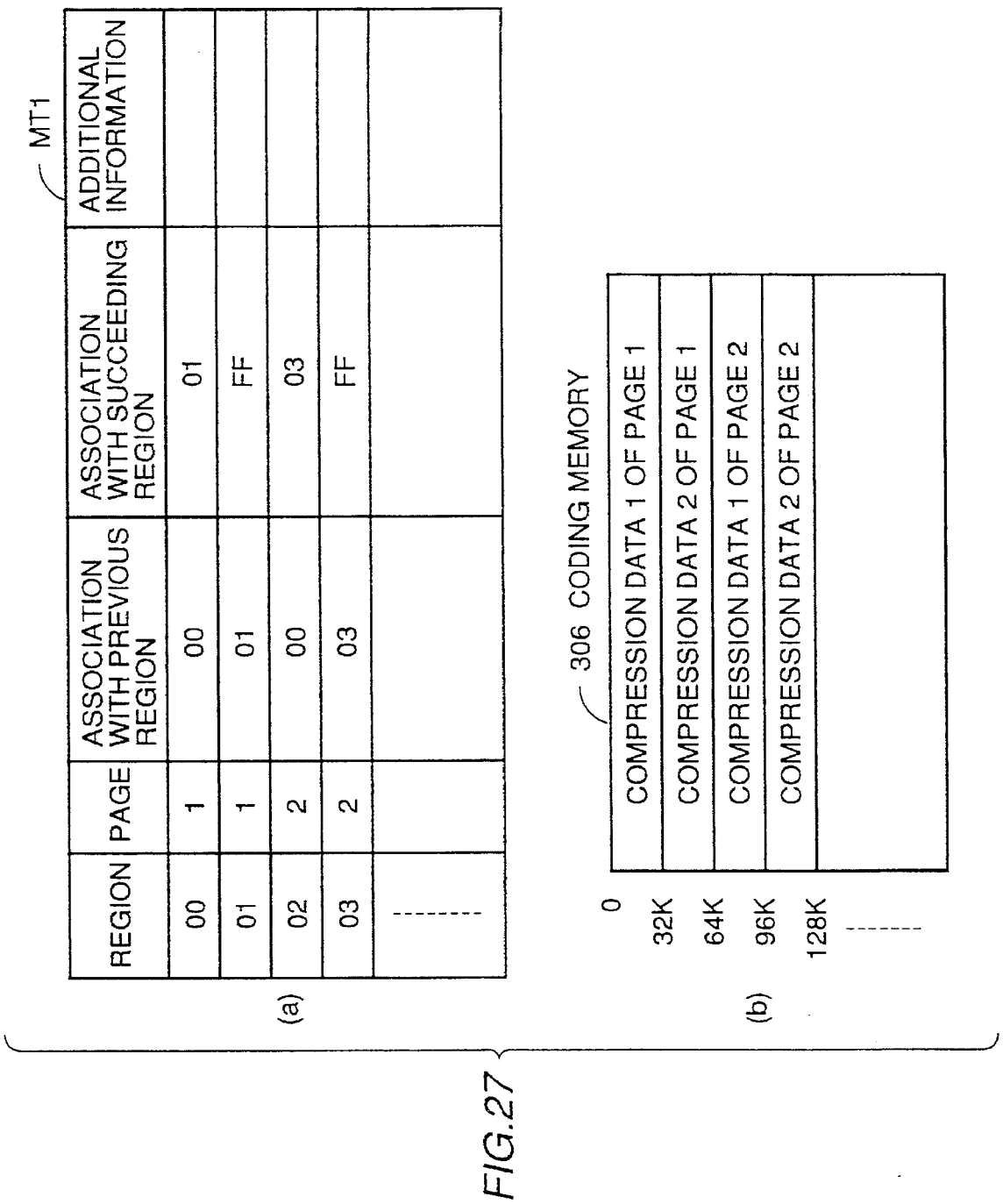
FIG. 27 is a diagram showing a relationship between a management table MT1 and a coding memory.

Coding memory 306 is managed by management table MT1 stored in RAM 121. FIG. 27 is a diagram showing a relationship between management table MT1(a) and coding memory 306(b). Coding memory 306 is divided into memory regions for every 32K bytes. Taking into consideration the capability of simultaneous control of writing (at the time of reading) and reading (at the time of printing), coding data for every page is stored in respective regions.

The number showing a region of coding memory 306, the page number, the number of coupled regions, and various kinds of additional information necessary for the compressing/expanding processing such as a compression system and a data length are stored in management table MT1. Based on the information, coding memory 306 is dynamically managed.

Association with the previous region in FIG. 27(a) shows a connection of a region for every 32K bytes in one page in the forward direction and whether or not the region being the first region. Association with the previous region shows the first region by "00", and the previous region number otherwise. Similarly, association with the succeeding region shows the last region by "FF", and the succeeding region number otherwise.

In reading out the image data from image memory 304 and compressing the same, CPU 6 controls compressor 311 while creating information of management table MT1 and stores the same in coding memory 306. In outputting the image data, CPU 6 reads out coding data from coding memory 306 by the operation opposite thereto. As for the information in management table MT1, the information of a page of interest is erased when the necessary number of copied papersheets are all normally discharged.

Description will now be given of detection of the direction of a character of the image.

FIG. 28 shows a discrimination algorithm of the mounting direction of the original step (STEP) by step. The contents of STEPs 1 and 2 have already been described in the image processing portion.

Figure 29:
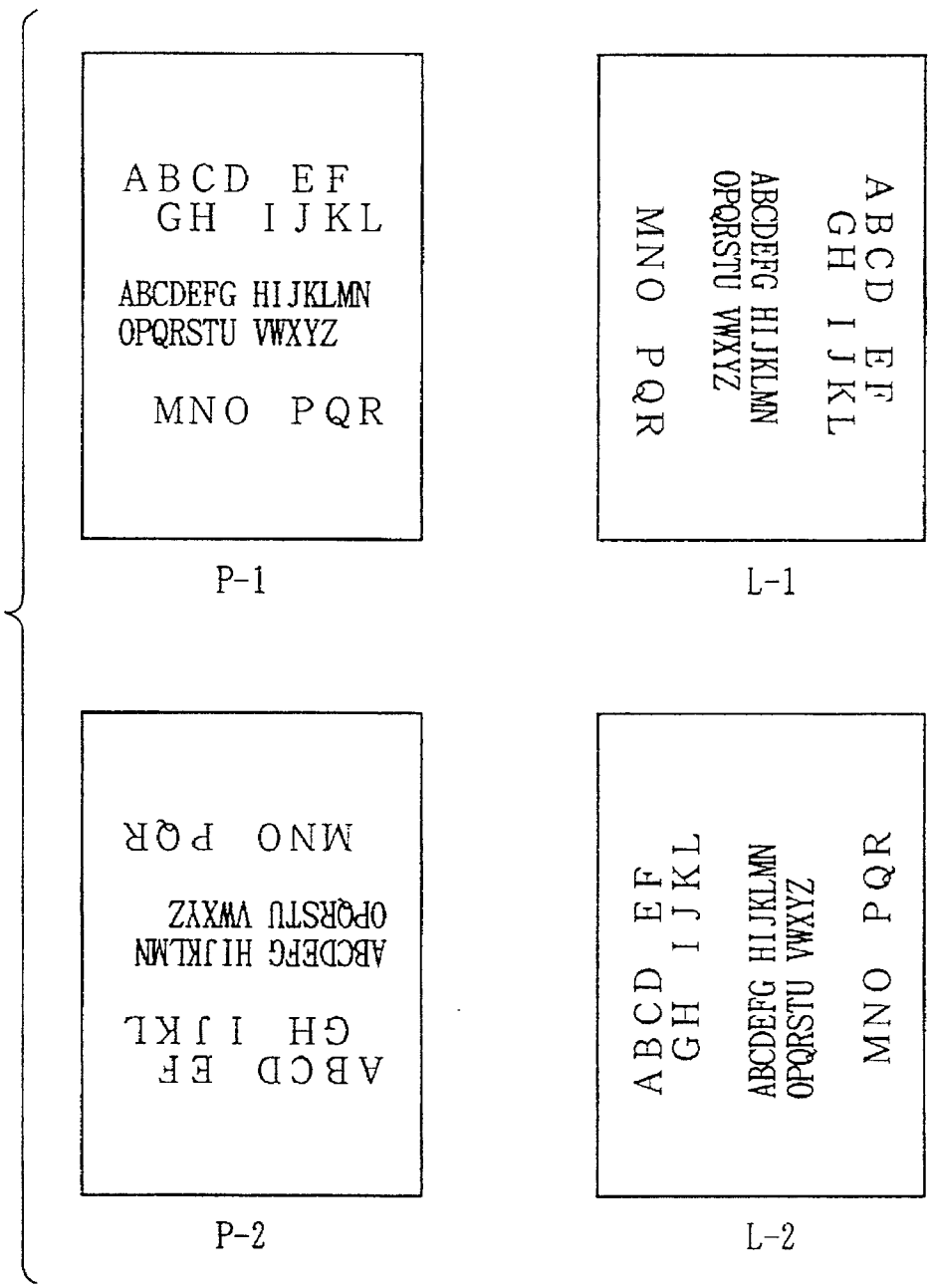
FIG. 29 is a diagram showing an example of data depending on the mounting states of originals when an image of an A4 sized original in the longitudinal direction is read out.

FIG. 29 shows examples of data depending on the mounting states of an original when an image of an A4 sized longitudinal original is read out. In the figure, P-1 shows an original of a portrait directed upwards, and P-2 is an original of a portrait directed downwards. L-1 is an original of a landscape directed upwards, and L-2 is an original of a landscape directed downwards.

Figure 30:
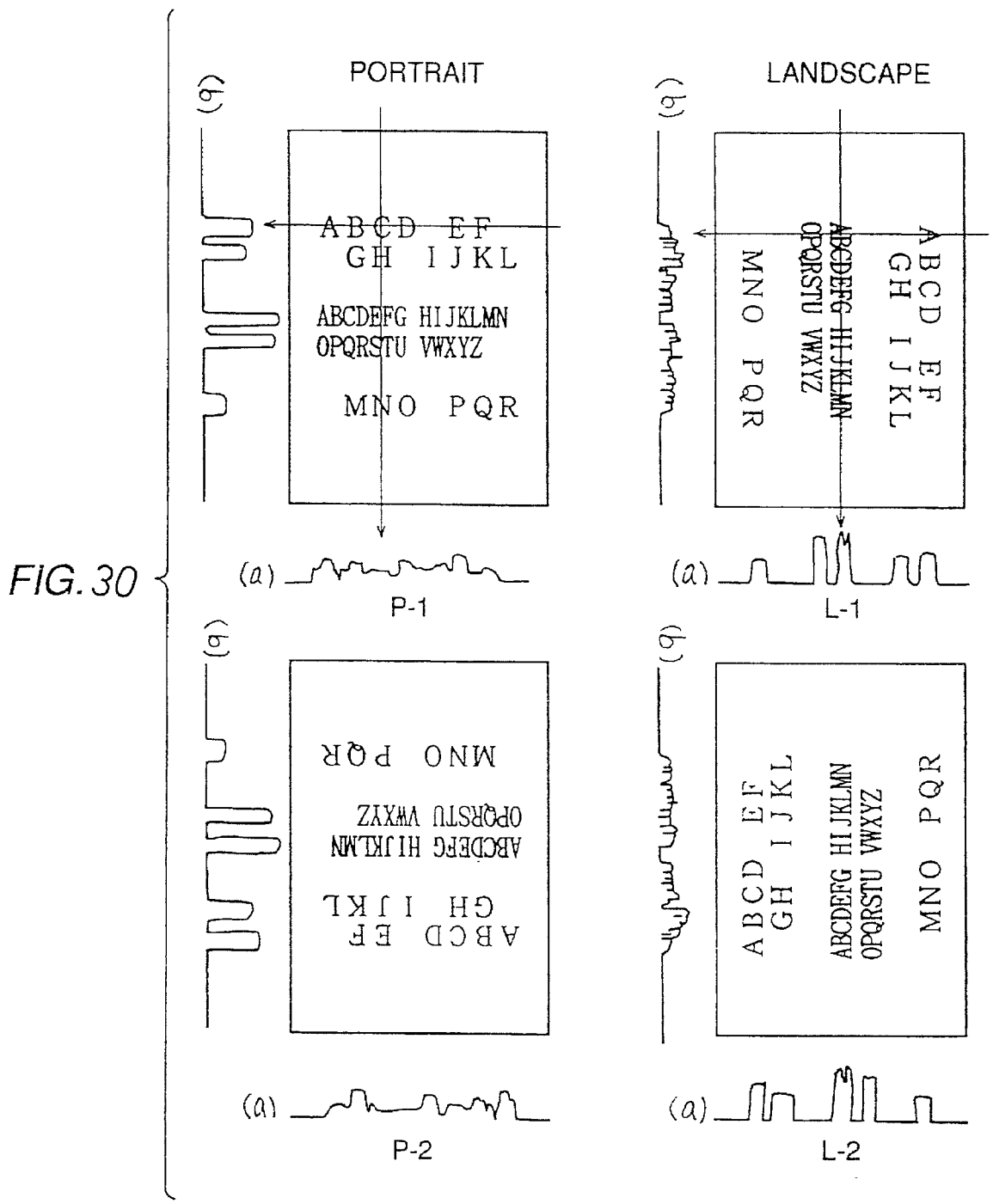
FIG. 30 is a diagram showing counting results of the number of black pixels for every main/subscanning.

FIG. 30 is a diagram explaining that CPU 5 calls image data from image memory 304 in the main scanning direction and the subscanning direction for respective originals shown in FIG. 29, determines for every pixel whether or not it is a black pixel ("0" or "1"), and counts black ("1") pixels. This corresponds to STEP 3 of FIG. 28. Based on the counting result, at STEP 4, distribution of the number of black pixels for every line is checked to determine whether the original is a landscape or a portrait.

The determination data in the case is shown in (a) and (b) of each figure.

Figure 31:
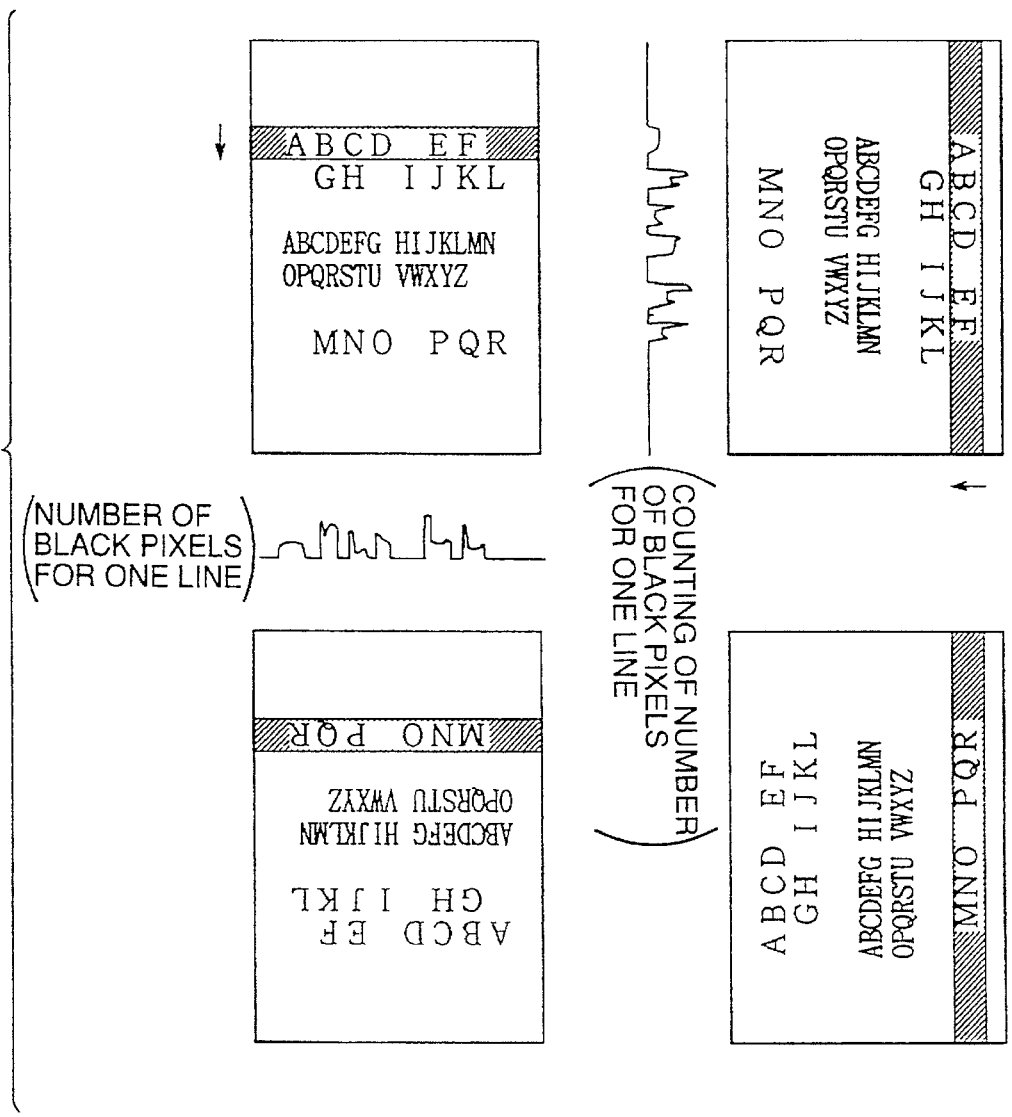
FIG. 31 is a diagram showing reading out of lines and counting results of the number of black pixels in the character directions.

FIG. 31 is a diagram showing the state in which reading out of a line and counting of black pixels in the character direction in STEP 5, STEP 6 are carried out to read out a character. The number of black pixels for one row is shown beside the figure.

Figure 32:
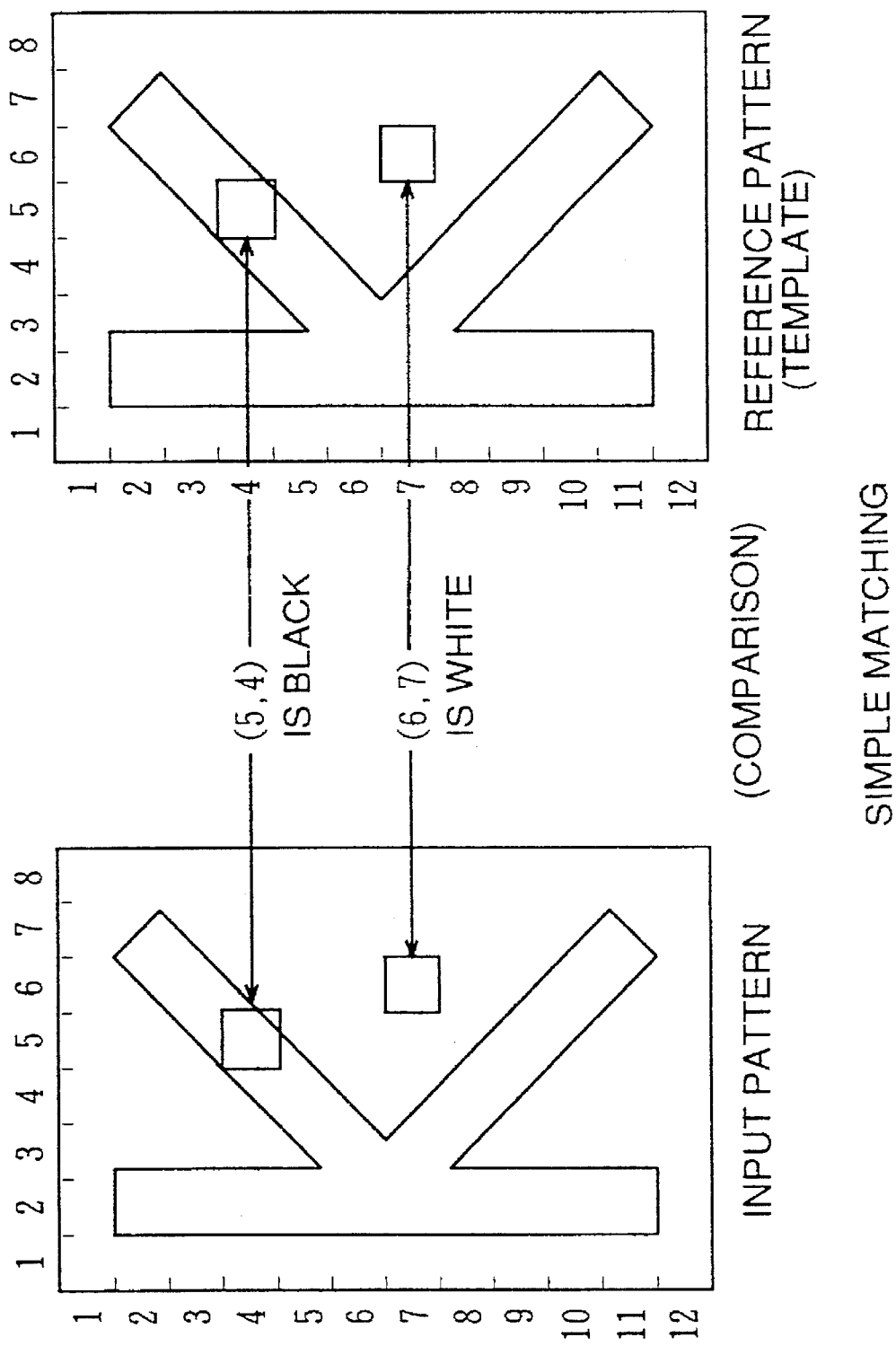
FIG. 32 is a diagram showing a pattern matching method, which is one example of character recognition.

FIG. 32 is a diagram showing a method of character recognition by pattern matching shown in STEP 8 of FIG. 28.

A template is prepared in advance for every character to be read. Inputted unknown character patters are superimposed onto the template. Comparison is made for each pixel. When all the patterns coincide perfectly, it is determined that the character on the template is the inputted character. There are an optical method carrying out the matching simultaneously for all pixels, and a method of carrying out the matching sequentially pixel by pixel.

FIG. 33 is a diagram showing a specific example for determining the direction of the original based on the character recognition result at STEPs 9–12 of FIG. 28.

The direction of the original image is recognized based on pattern recognition for every character read out and a rotation angle.

CPU 5 creates an original management table DT2 shown in FIG. 34 based on a discrimination algorithm shown in FIG. 28.

Based on thus obtained data of the original image, memory unit portion 30 shown in FIG. 26 binary converts image data D2 in binary conversion processing portion 302 before incorporating the image data D2 into image memory 304 to carry out predetermined processings. Then, memory unit portion 30 reads out the image data from image memory 304 as necessary to provide the same to printing processing portion 40 as image data D3. When the image data is read out from image memory 304, a rotation, a multi-array conversion processing, and a variable-scale magnification processing are carried out in respective processing portions 307, 308, 309 in response to an instruction from CPU 5.

Description will now be given of the case where CPU 5 calls the image data from image memory 304 to carry out printing. At this time, CPU 5 calculates the output mode according to the paper size signal of the selected paper feeding cassette sent from CPU 4. In this embodiment, the case is shown where the images are provided with the uniform top and bottom direction of the character of the originals for portrait/landscape. As for the reference top and bottom direction, the top and bottom direction of the original having a smaller page member is made reference. For example, the case is considered where an A4 sized longitudinal papersheet (the longitudinal length of the papersheet is 297 mm, and the lateral length of the papersheet is 210 mm) is set at the selected paper feeding cassette.

Figure 35:
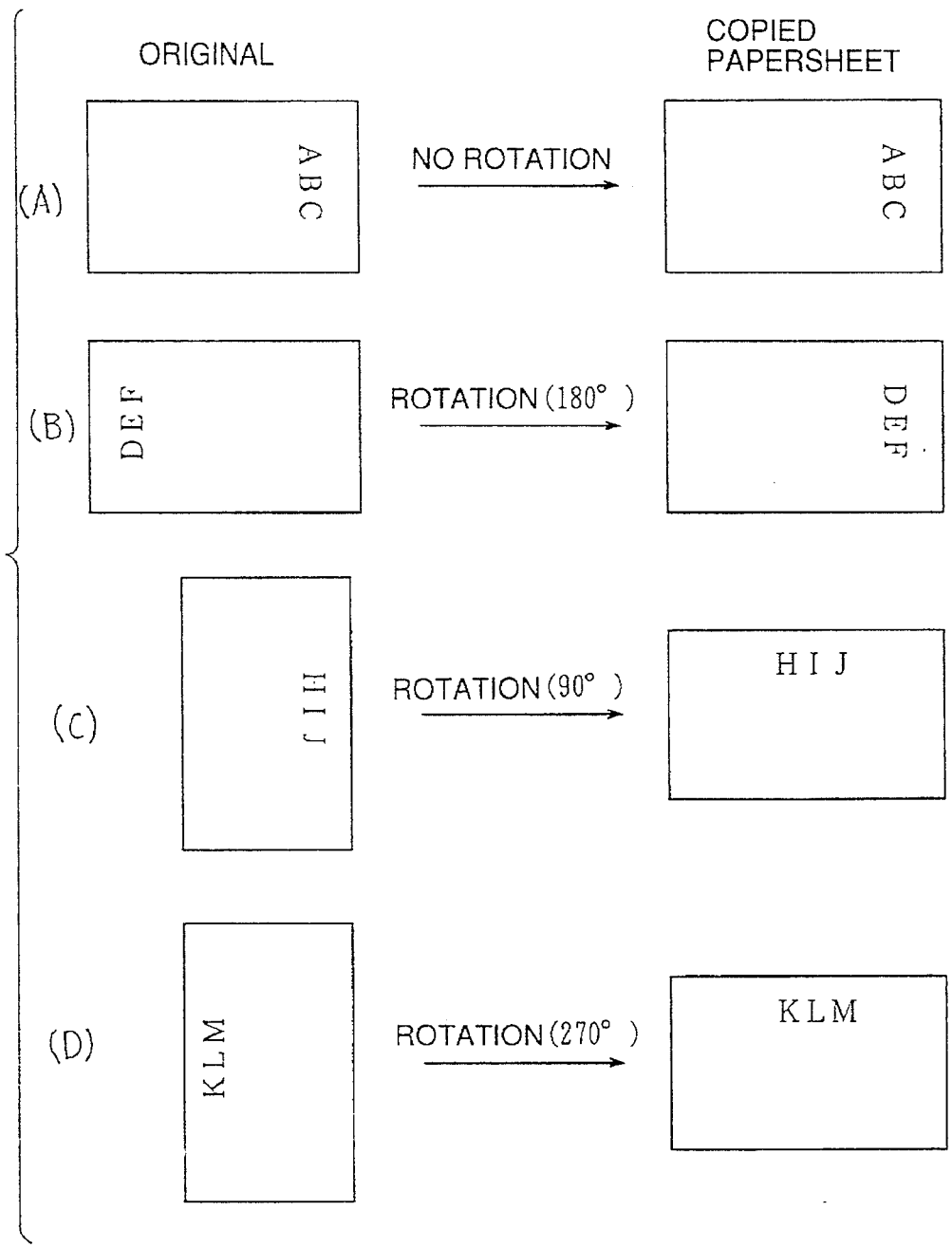
FIGS. 35 and 36 are diagrams showing a relationship between an original and a copy papersheet in the second embodiment.
Figure 36:
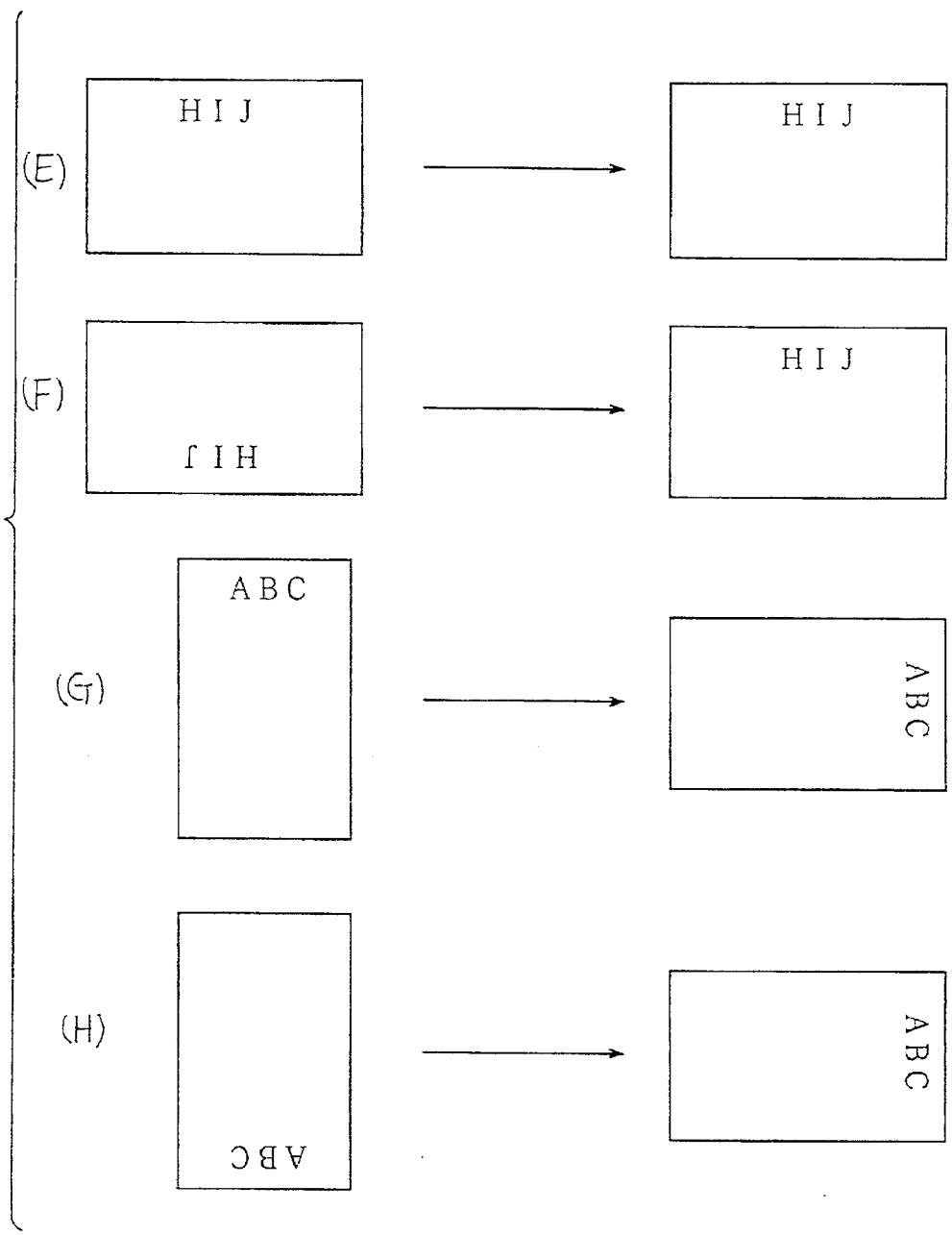

In this case, the relationship between the original and the copy papersheet on which the image is to be printed is shown in FIGS. 35 and 36. Papersheets on the left show the originals and the papersheets on the right shows the copied papersheets in respective figures.

(A) The First Page

In the first page, the directions and the sizes of the original and the papersheet coincide according to the original management table. Therefore, the image is read out from the coding memory without being subjected to the rotation processing.

(B) The Second Page

The top and bottom direction of the second page is opposite to that of the first page. Therefore, after being subjected to the 180° rotation processing, the image of the second page is read out from coding memory 306.

(C) The Third Page

The direction of the original of the third page is different from the feeding direction the papersheet. Therefore, after being subjected to the 90° rotation processing, the image of the third page is read out from coding memory 306.

(D) The Fourth Page

Although the direction of the original of the fourth page is the same as that of the third page, the top and bottom direction is reversed. Therefore, after being subjected to the 270° rotation processing, the image of the fourth page is read out from coding memory 306. The same processings are carried out also in the case shown in FIG. 36.

Figure 37:
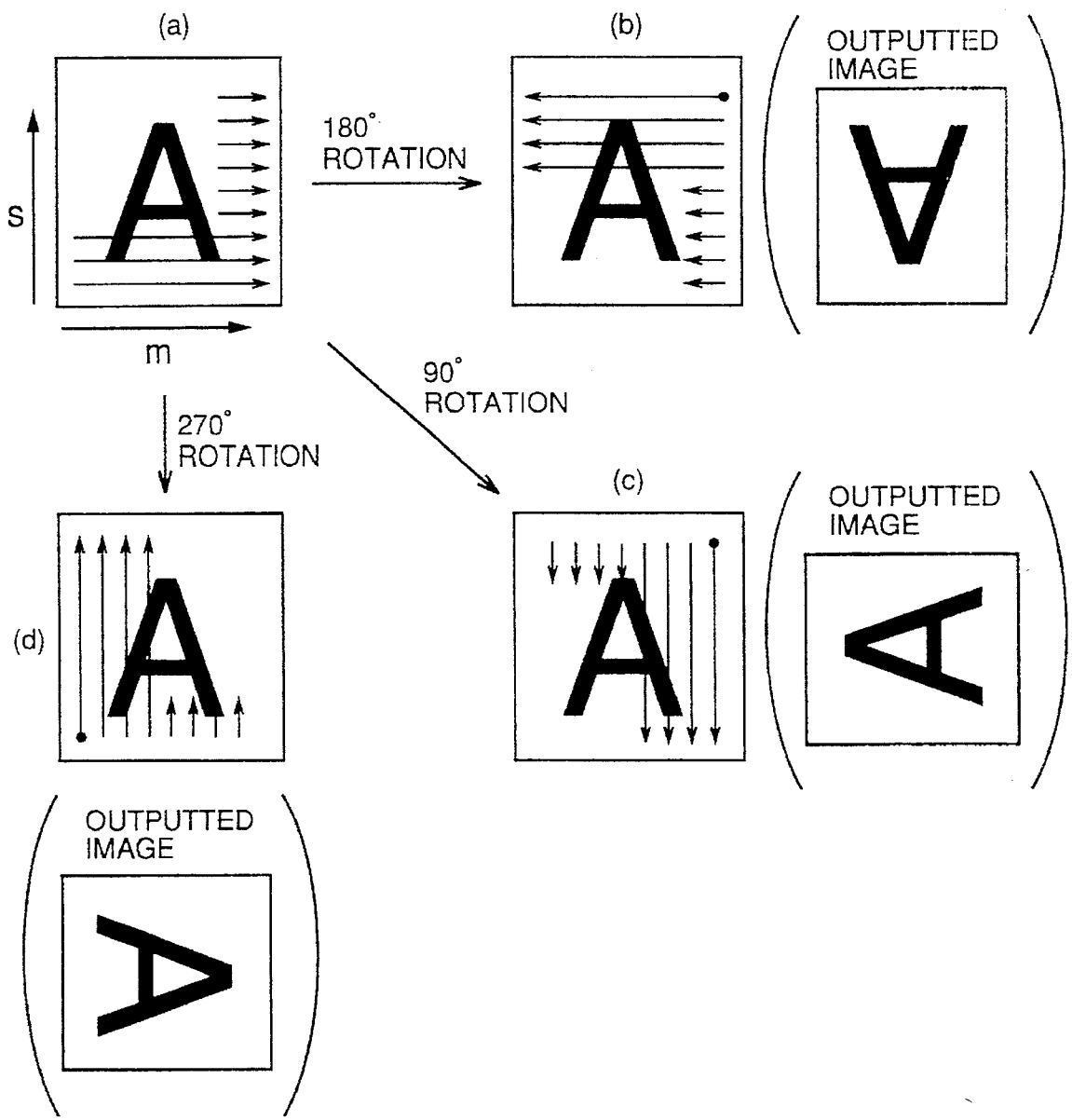
FIG. 37 is a diagram for explaining a data processing method in a rotation processing portion.

Description will now be given of the specific rotation processing in rotation processing portion 307 with reference to FIG. 37. Rotation processing portion 307 rotates the image by controlling addressing in reading out the image data from image memory 304.

It is assumed that the image data shown in (a) of the figure is stored in image memory 304. Here, m shows the main scanning direction, and s shows the subscanning direction. When the image is rotated by 180°, addressing is sequentially carried out in the direction of arrows from a position shown by a black dot of image memory 304 as shown in (b) of the figure to read out the image data. As a result, an output image rotated by 180° as shown in parentheses of (b) of the figure can be obtained. When the image is rotated by 90° and 270°, addressing is sequentially carried out in the direction of arrows from positions shown by black dots in (c) and (d) of the figure, respectively, to read out the image data.

In the above-described embodiment, the case was shown where images of originals placed in various manners are provided arranged in one direction according to the paper size of the selected paper feeding cassette. Then a modification of the second embodiment will be described. In the modification, a plurality of selected paper feeding cassettes exist. In this case, the image is formed on the copied papersheet depending on the paper size and the direction of the original.

Figure 38:
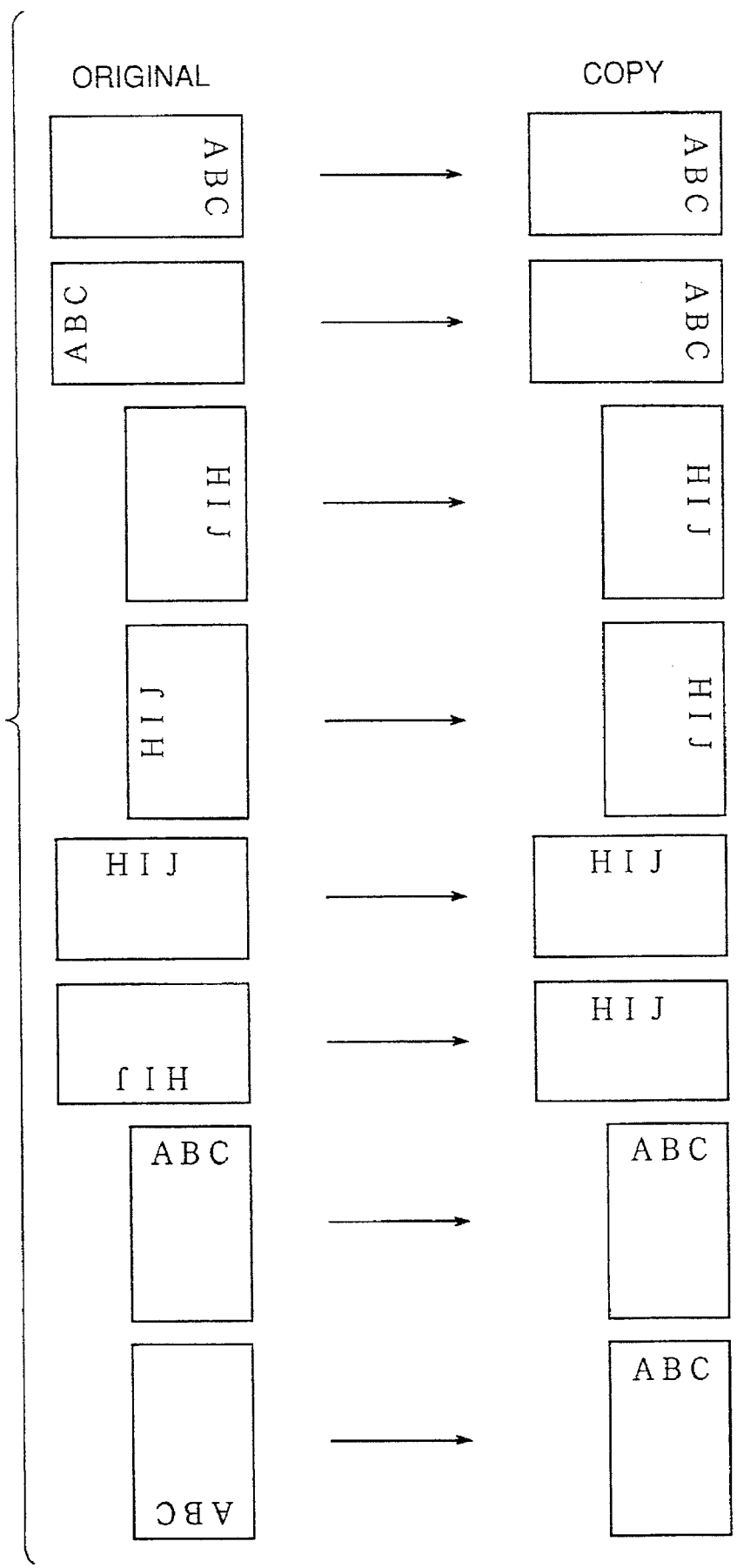
FIG. 38 is a diagram showing a relationship between an original and a copy papersheet in a modification of the second embodiment.

FIG. 38 shows the relationship between specific originals and copied papersheets.

Since the configuration of the copying apparatus in the modification of the second embodiment is basically the same as that of the above embodiment, the description thereof will not be repeated.

Another modification of the second embodiment will now be described. Also in this case, the configuration of the copying apparatus as an example of the image processing apparatus is the same similar to the above-described second embodiment. In another modification, when there exist a plurality of originals in portrait printing of the A4 longitudinal direction and a plurality of originals in landscape printing of the A4 lateral direction, these originals can be all provided in portrait printing onto papersheets of the A4 lateral direction. Therefore, in another embodiment, not only the rotation of the image as is carried out in the first and the second embodiments but also the variable-scale magnification processing are carried out by variable-scale magnification processing portion 309 (cf. FIG. 26).

Figure 39:
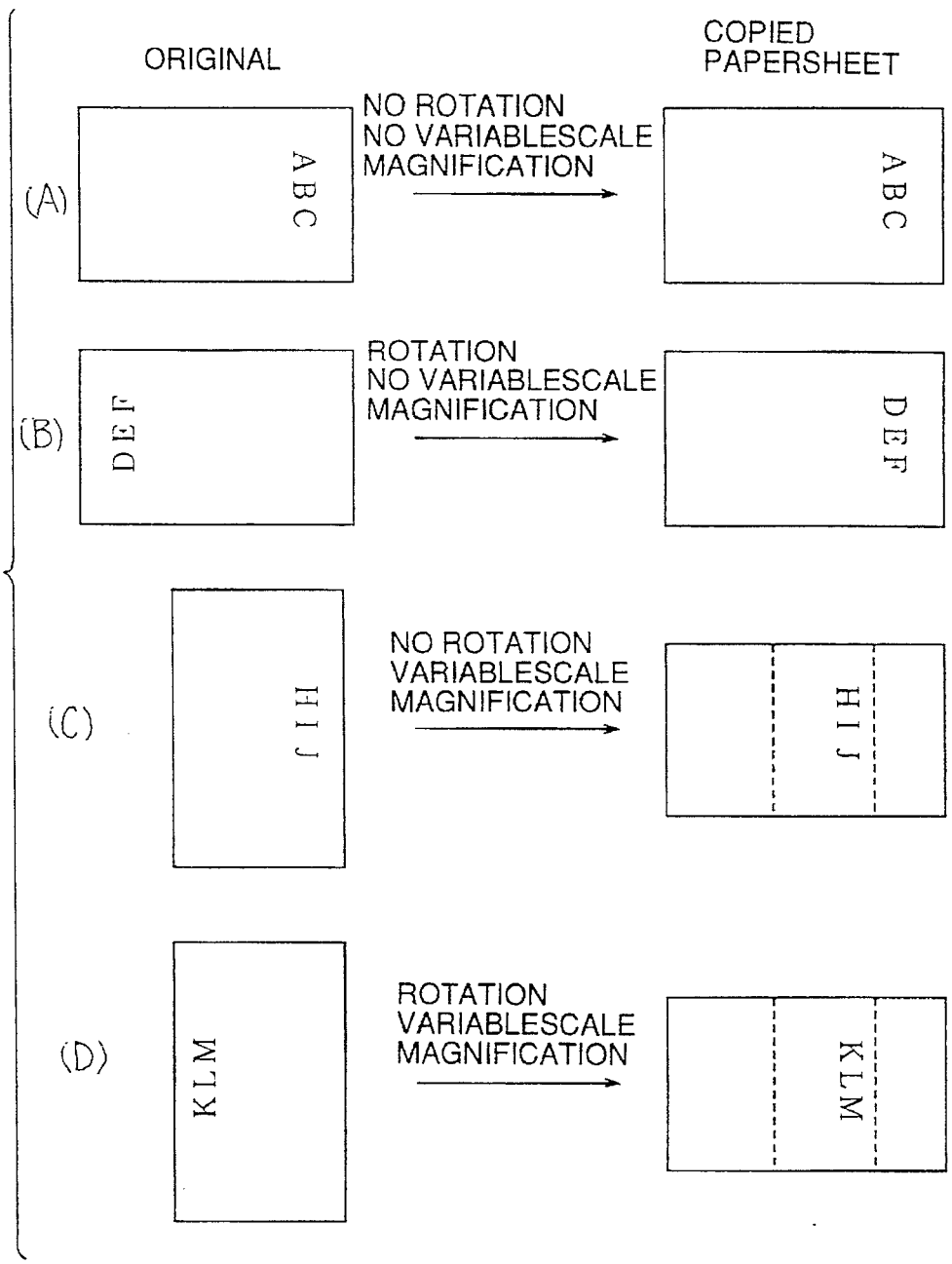
FIGS. 39 and 40 are diagrams showing a relationship between an original and a copy papersheet in another modification of the second embodiment.

An example in this case will be described with reference to FIGS. 39 and 40. In this embodiment, the second et seq. originals are provided with the original direction and the character direction matching those of the first page first stored. Consider the case where a papersheet of the A4 longitudinal direction is set at the selected paper feeding cassette as an example.

(A) The First Page

In the first page, the direction and the size of the original coincide with those of a papersheet according to an original management table. Therefore, the image of the original is read out from coding memory 306 without being subjected to the variable-scale magnification processing and the rotation processing.

(B) The Second Page

The original of the second page is reversed with respective to the first page. Therefore, after rotating the original by 180°, the image of the original is read out from coding memory 306.

(C) The Third Page

The direction of the original of the third page is different from the feeding direction of a papersheet. Therefore, a variable-scale magnification is calculated based on the longer side of the original and the shorter side of the papersheet. More specifically, in this case, the variable-scale magnification processing is carried out with a reduction ratio of 0.707.

(D) The Fourth Page

As for the direction of the original, it is the same as that of the third page. Therefore, the variable-scale magnification processing is carried out with the reduction ratio of 0.707. The character direction of the fourth page is different from that of the third page by 180°. Therefore, after being subjected to the 180° rotation processing, the image is read out from coding memory 306. Same processings are applicable to the papersheets shown in FIG. 40.

(3) Third Embodiment

Description will now be given of the third embodiment of the present invention. The third embodiment is an embodiment in the case where the present invention is applied to an image processing apparatus such as a copying apparatus having a so-called AMS function. Since the configuration of the copying apparatus as an image processing apparatus, the configuration of the control portion, a method of detecting the original size, the configuration of the memory unit portion, the original management table and the like are the same as those in the case of the second embodiment, the description thereof will not be repeated.

Operations in the third embodiment will now be described. In the third embodiment, reading of the original, detecting of the size, storing of the image data into the image memory, outputting of the image data from the image memory to the printing processing portion are the same as those of the second embodiment. Therefore, the description thereof will not be repeated.

The difference between the third embodiment and the second embodiment will now be described. In the third embodiment, when CPU 5 reads out the image data from the memory to carry out printing, CPU 5 calculates the output mode according to the feeding direction and the paper size of a papersheet of the selected paper feeding cassette sent from CPU 4. More specifically, it is determined whether or not the mounting direction of an original and the feeding direction of a papersheet are the same. If the direction of the original and the direction of the papersheet are the same, an instruction of the rotation processing is not given. If the direction of the original and the direction of the papersheet are different, an instruction of the rotation processing is given to CPU 6. By comparing the length of the longer side of the papersheet and the length of the longer side of the original, the variable-scale magnification is calculated, and an instruction of the variable-scale magnification processing is given to CPU 6.

Since in this embodiment, a copying apparatus having an AMS function is employed, one kind of a papersheet is determined in advance as the copy papersheet. As an example, the case is considered where a papersheet of the A4 longitudinal direction (the longitudinal length of the papersheet is 297 mm, and the lateral length of the papersheet is 210 mm) is set at the selected paper feeding cassette.

As for the original size, it is known in advance from the management table (FIG. 6).

Figure 40:
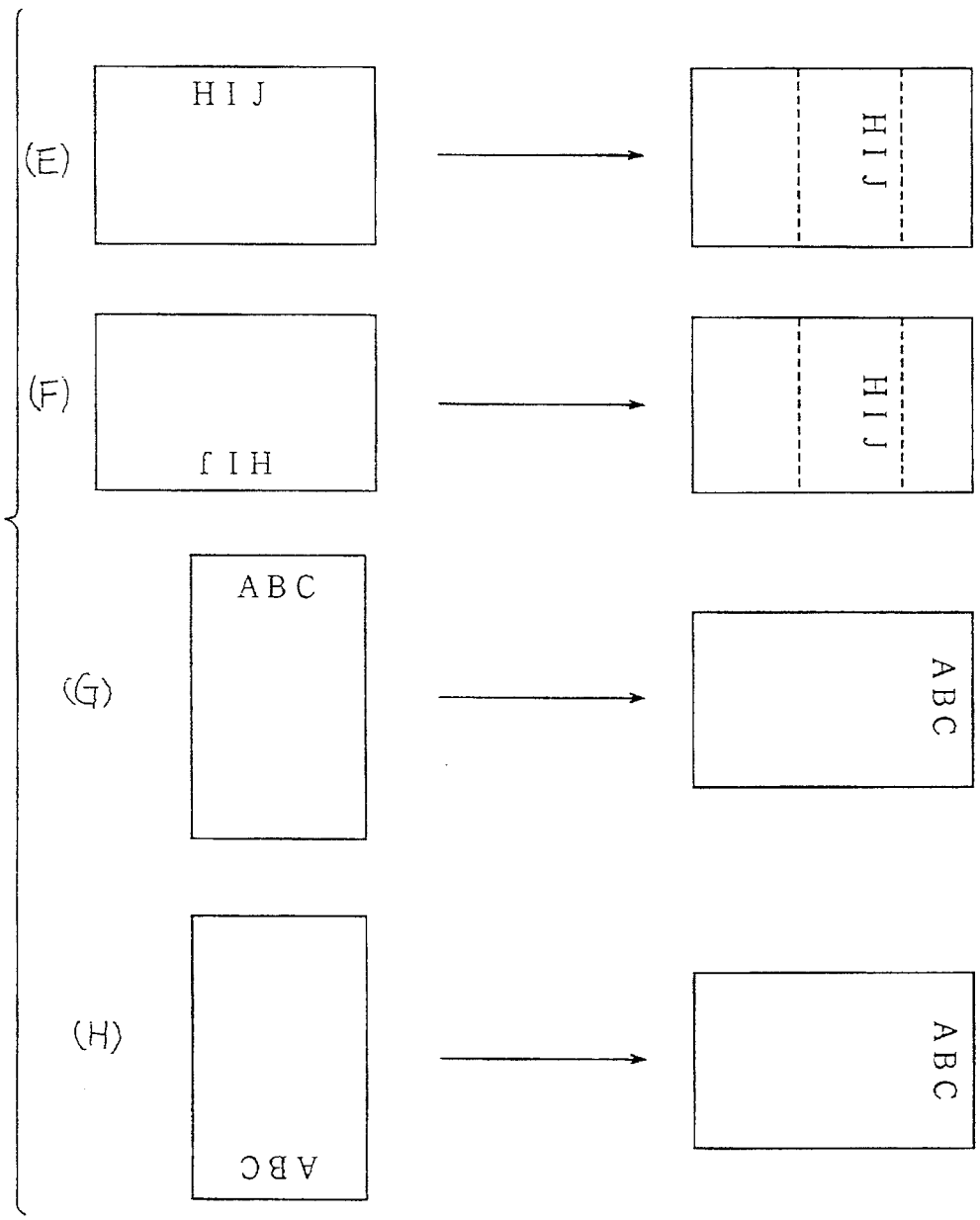
Figure 41:
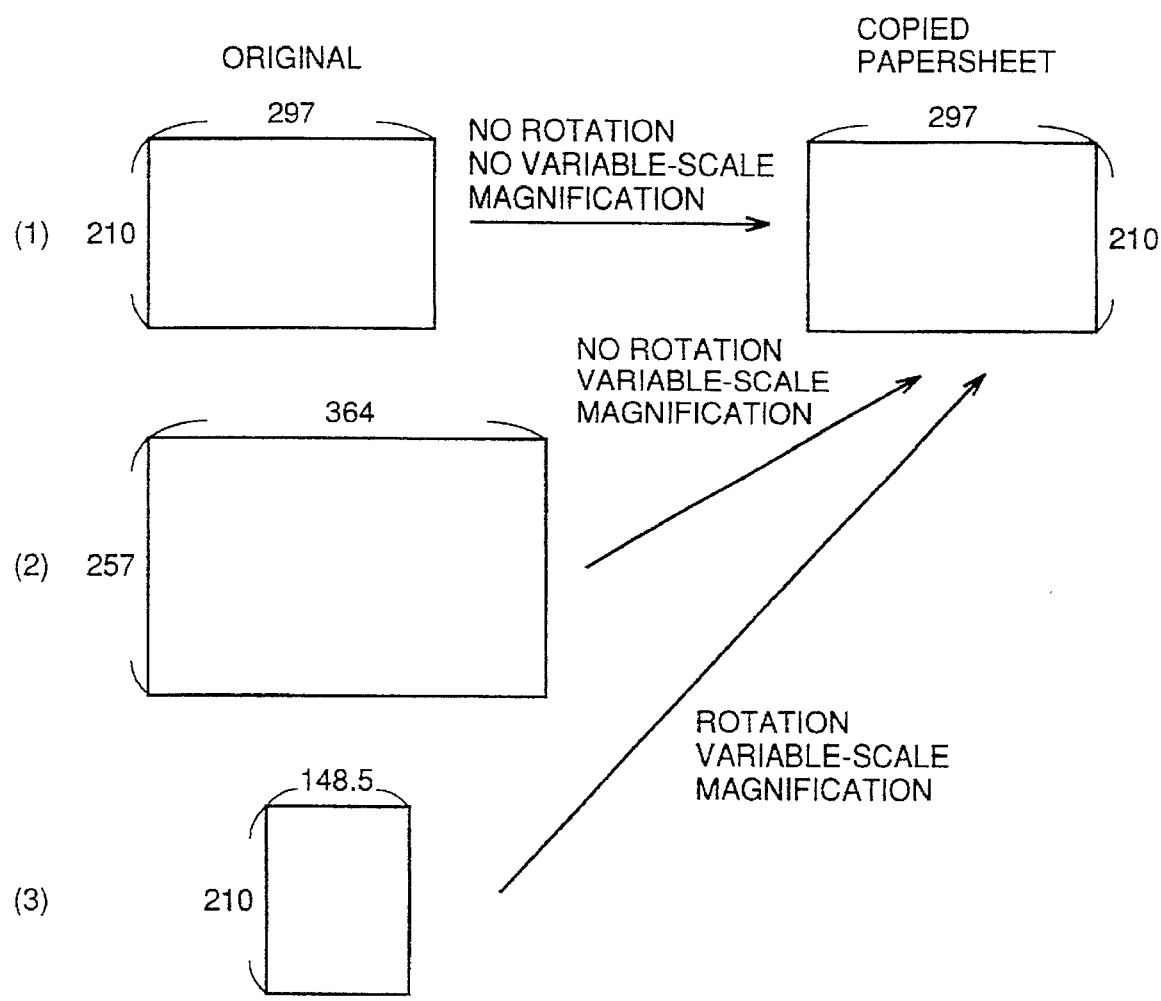
FIG. 41 is a diagram showing a relationship between an original which can be copied and a copy papersheet in a third embodiment.

Referring to FIG. 40, the original size is shown on the left, and the copy papersheet (A4) set in the selected paper feeding cassette is shown on the right. (1)–(3) in the figure correspond to the first page to the third page of the originals.

(1) The First Page

Both the directions and the sizes of the original and the papersheet coincide. Therefore, image data D3 is read out from coding memory 306 without being subjected to the variable-scale magnification processing and the rotation processing in variable-scale magnification processing portion 309 and rotation processing portion 307.

(2) The Second Page

The direction of the original and the direction of the papersheet coincide. Therefore, the variable-scale magnification is calculated based on the longitudinal length of the papersheet/the longitudinal length of the original. With the variable-scale magnification, data from coding memory 306 is processed in variable-scale magnification processing portion 309 to be provided as image data D3.

(C) The Third Page

Both the sizes and the directions of the original and the papersheet are different. Therefore, after being subjected to the 90° rotation processing and the variable-scale magnification processing in rotation processing portion 307 and variable-scale magnification processing portion 309, the image data is read out from coding memory 306.

As is seen from the above embodiments, even if the original sizes are in plural and the directions of the originals are varied, it is possible to copy images of all kinds of originals onto one kind of copy papersheets without preparing a plurality kinds (paper size, feeding direction) of copy papersheets.

In the above embodiments, description was given of a copying apparatus handling an original and a copy papersheet of a regular size. However, the present invention is not limited thereto, and an original and a copy papersheet of an irregular size may be handled. For example, if a smaller one of a variable-scale magnification calculated based on comparison of longer sides of an original and a copy papersheet and a variable scale magnification calculated based on comparison of shorter sides is employed, it is possible to handle with an original and a copy papersheet of an irregular size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:

an image reader which reads out an original at a predetermined position to output image data of the original;

a reversing path which reverses said original having a first side read out at said predetermined position and feeds said original to said predetermined position in order to read out a second side which is a back side of said first side, wherein said image reader outputs first image data corresponding to said first side and second image data corresponding to said second side;

a mode selector which selects a duplex mode, printing said first and second image data onto both sides of one paper sheet, and a one side mode printing said first image data onto one side of one paper sheet and printing said second image data onto one side of another paper sheet; and an image rotator which rotates by 180° one of said first and second image data with respect to the other thereof when said one side mode is selected and inhibits rotating of said first and second image data when said duplex mode is selected.

2. The image processing apparatus as recited in claim 1, wherein said image rotator includes a memory which stores the image data provided from said image reader and rotates said image data by controlling an address in reading out said image data from said memory.

3. An image processing apparatus, comprising:

an image reader which reads out an original at a predetermined position to output image data of the original;

a reversing path which reverses said original having a first side read out at said predetermined position and feeds said original to said predetermined position in order to read out a second side which is a back side of said first side, wherein said image reader outputs first image data corresponding to said first side and second image data corresponding to said second side;

a detector which detects the direction of said original to be read out with respect to the reading direction; and an image rotator which rotates by 180° one of said first and second image data with respect to the other thereof when it is detected by said detector that the original is longer in a subscanning direction of said image reader and inhibits rotating of the first and second image data when it is detected by said detector that the original is longer in the mainscanning direction of said image reader.

4. The image processing apparatus as recited in claim 3, further comprising:

a printer which prints the first image data onto one side of one paper sheet and prints the second image data onto one side of another paper sheet.

5. An image processing apparatus, comprising:

an image reader which reads out an original at a predetermined position to output image data of the original;

a reversing path which reverses the original having a first side read out at said predetermined position and feeds said original to said predetermined position in order to read out a second side which is a back side of said first side, wherein said image reader outputs first image data corresponding to said first side and second image data corresponding to said second side;

a detector which detects the direction of said original to be read out with respect to the feeding direction; and an image rotator which rotates by 180° one of said first and second image data with respect to the other thereof when it is detected by said detector that the original is longer in the feeding direction of said reversing path and inhibits rotating of the first and second image data when it is detected by said detector that the original is shorter in the feeding direction of said reversing path.

6. The image processing apparatus as recited in claim 5, further comprising:

a printer which prints the first image data onto one side of one paper sheet and prints the second image data onto one side of another paper sheet.

* * * * *